(12) United States Patent
Akita et al.

(10) Patent No.: US 6,717,317 B2
(45) Date of Patent: Apr. 6, 2004

(54) STATOR FOR A DYNAMOELECTRIC MACHINE

(75) Inventors: Hiroyuki Akita, Tokyo (JP); Syuuichi Tamura, Tokyo (JP); Takushi Takizawa, Tokyo (JP); Mitsuharu Hashiba, Tokyo (JP); Naohiro Oketani, Tokyo (JP); Atsushi Oohashi, Tokyo (JP); Yoshihito Asao, Tokyo (JP); Katsumi Adachi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/004,423

(22) Filed: Dec. 6, 2001

(65) Prior Publication Data

US 2002/0145356 A1 Oct. 10, 2002

(30) Foreign Application Priority Data

Apr. 6, 2001 (JP) ........................ 2001-108447

(51) Int. Cl.[7] ............................ H02K 3/32; H02K 3/04; H02K 1/22
(52) U.S. Cl. ...................... 310/184; 310/201; 310/208; 310/179
(58) Field of Search ................... 310/184, 179, 310/201, 208, 50–60 A, 52, 64, 65, 215

(56) References Cited

U.S. PATENT DOCUMENTS

| 324,358 | A | * | 8/1885 | Cabot | 379/438 |
|---|---|---|---|---|---|
| 1,784,815 | A | * | 12/1930 | Apple | 310/211 |
| 1,826,295 | A | * | 10/1931 | Apple | 310/201 |
| 4,402,129 | A | * | 9/1983 | Kreuzer et al. | 29/596 |
| 4,426,771 | A | * | 1/1984 | Wang et al. | 29/596 |
| 4,520,287 | A | * | 5/1985 | Wang et al. | 310/184 |
| 4,918,347 | A | * | 4/1990 | Takaba | 310/179 |
| 5,097,167 | A | * | 3/1992 | Kanayama et al. | 310/201 |
| 5,714,824 | A | * | 2/1998 | Couture et al. | 310/208 |
| 5,789,833 | A | * | 8/1998 | Kinoshita et al. | 310/64 |
| 5,936,326 | A | * | 8/1999 | Umeda et al. | 310/179 |
| 5,952,749 | A | * | 9/1999 | Umeda et al. | 310/63 |
| 5,955,810 | A | * | 9/1999 | Umeda et al. | 310/208 |
| 5,965,965 | A | * | 10/1999 | Umeda et al. | 310/52 |
| 6,011,332 | A | * | 1/2000 | Umeda et al. | 310/58 |
| 6,091,169 | A | * | 7/2000 | Umeda et al. | 310/62 |
| 6,137,201 | A | * | 10/2000 | Umeda et al. | 310/179 |
| 6,181,045 | B1 | * | 1/2001 | Umeda et al. | 310/201 |
| 6,191,508 | B1 | * | 2/2001 | Aoki et al. | 310/45 |
| 6,285,105 | B1 | * | 9/2001 | Asao et al. | 310/208 |
| 6,373,163 | B1 | * | 4/2002 | Oohashi et al. | 310/198 |
| 6,388,358 | B1 | * | 5/2002 | Umeda et al. | 310/201 |
| 6,414,410 | B1 | * | 7/2002 | Nakamura et al. | 310/179 |
| 6,424,071 | B1 | * | 7/2002 | Oohashi et al. | 310/180 |
| 6,429,552 | B2 | * | 8/2002 | Asao et al. | 310/64 |
| 6,441,526 | B1 | * | 8/2002 | Oohashi et al. | 310/184 |
| 6,441,527 | B1 | * | 8/2002 | Taji et al. | 310/201 |
| 6,469,413 | B1 | * | 10/2002 | Oohashi et al. | 310/184 |

(List continued on next page.)

FOREIGN PATENT DOCUMENTS

| JP | 55063559 | * | 5/1980 | .......... H02K/17/08 |
| JP | 11-164505 | | 6/1999 | |
| JP | 1248350 | * | 1/2002 | ............ H02K/3/12 |

*Primary Examiner*—Dang Le
*Assistant Examiner*—H. Elkassabgi
(74) *Attorney, Agent, or Firm*—Sughrue Mion, PLLC

(57) ABSTRACT

In a connection portion of a stator winding, conductor wires extending outward from a slot pair separated by a predetermined number of slots are joined such that end portions of conductor wires extending outward from addresses of the slot pair separated by three or more addresses are joined together (a distant-address joint portion), and end portions of conductor wires in the slot pair separated by two or less addresses are joined together (a near-address joint portion). The distant-address joint portion is offset in a circumferential direction relative to the near-address joint portion.

14 Claims, 19 Drawing Sheets

U.S. PATENT DOCUMENTS

| | | | | |
|---|---|---|---|---|
| 6,498,414 | B2 * | 12/2002 | Asao | 310/184 |
| 6,501,204 | B1 * | 12/2002 | Oohashi et al. | 310/179 |
| 6,501,206 | B2 * | 12/2002 | Oohashi et al. | 310/184 |
| 6,504,283 | B1 * | 1/2003 | Asao et al. | 310/254 |
| 6,507,137 | B2 * | 1/2003 | Asao et al. | 310/208 |
| 6,525,443 | B2 * | 2/2003 | Asao | 310/201 |
| 6,552,463 | B2 * | 4/2003 | Oohashi et al. | 310/207 |
| 2001/0020807 | A1 * | 9/2001 | Imori et al. | 310/254 |
| 2002/0047449 | A1 * | 4/2002 | Kim et al. | 310/184 |
| 2002/0047450 | A1 * | 4/2002 | Asao et al. | 310/184 |
| 2002/0079771 | A1 * | 6/2002 | Taji et al. | 310/179 |
| 2002/0135257 | A1 * | 9/2002 | Umeda | 310/179 |
| 2002/0145356 | A1 * | 10/2002 | Akita et al. | 310/184 |
| 2002/0180299 | A1 * | 12/2002 | Oohashi et al. | 310/184 |
| 2002/0190596 | A1 * | 12/2002 | Imori et al. | 310/184 |

* cited by examiner

STATOR FOR A DYNAMOELECTRIC MACHINE

This application is based on Application No. 2001-108447, filed in Japan on Apr. 6, 2001, the contents of which are hereby incorporated by reference.

BACKGROUND OF THE INVENTION

1. Field of the Invention

The present invention relates to a stator for a dynamoelectric machine such as automotive alternators, etc, and particularly to a stator construction for improving cooling in a joint portion of a conductor wire constituting a stator winding.

2. Description of the Related Art

FIG. 24 is a longitudinal section showing a first conventional automotive alternator, and FIG. 25 is a perspective showing a conductor segment used in a stator winding of a stator mounted to the first conventional automotive alternator. FIG. 26 is a rear end elevation schematically showing a first winding phase portion of the stator winding of the stator mounted to the first conventional automotive alternator. In FIG. 26, solid lines indicate rear-end wiring, broken lines indicate front-end wiring, and black circles indicate joint portions. FIG. 27 is a diagram schematically showing a rear-end portion of the stator in the first conventional automotive alternator viewed from a circumferential direction, FIG. 28 is a side elevation showing the rear-end portion of the stator mounted to the first conventional automotive alternator viewed from radially outside, and FIG. 29 is an end elevation showing the rear-end portion of the stator mounted to the first conventional automotive alternator viewed from axially outside. Moreover, in FIG. 24, the shapes of coil ends are represented schematically.

As shown in FIG. 24, a first conventional automotive alternator includes: a case 3 constituted by a front bracket 1 and a rear bracket 2 made of aluminum; a shaft 6 disposed inside the case 3, a pulley 4 being secured to a first end portion of the shaft 6; a Lundell-type rotor 7 secured to the shaft 6; fans 5 secured to first and second axial end portions of the rotor 7; a stator 8 secured to the case 3 so as to envelop the rotor 7; slip rings 9 secured to a second end of the shaft 6 for supplying electric current to the rotor 7; a pair of brushes 10 sliding on surfaces of the slip rings 9; a brush holder 11 accommodating the brushes 10; rectifiers 12 each having a rectifier heat sink 12a, the rectifiers 12 being electrically connected to the stator 8 to convert alternating current generated in the stator 8 into direct current; and a regulator 18 mounted to a brush holder heat sink 17 fitted onto the brush holder 11, the regulator 18 adjusting the magnitude of the alternating voltage generated in the stator 8.

The rotor 7 includes: a field winding 13 for generating magnetic flux on passage of an electric current; and a pair of first and second pole cores 20 and 21 disposed so as to cover the field winding 13, magnetic poles being formed in the first and second pole cores 20 and 21 by magnetic flux therefrom. The first and second pole cores 20 and 21 are made of iron, each has a plurality of first and second claw-shaped magnetic poles 22 and 23 having a generally trapezoidal outermost diameter surface shape disposed on an outer circumferential edge portion at even angular pitch in a circumferential direction so as to project axially, and the first and second pole cores 20 and 21 are fixed to the shaft 6 facing each other such that the first and second claw-shaped magnetic poles 22 and 23 intermesh.

The stator 8 is constituted by: a cylindrical stator core 15; and a stator winding 16 installed in the stator core 15. The stator 8 is held between the front bracket 1 and the rear bracket 2 so as to form a uniform air gap between outer circumferential surfaces of the claw-shaped magnetic poles 22 and 23 and an inner circumferential surface of the stator core 15.

Here, a specific construction of the stator winding 16 will be explained with reference to FIGS. 25 and 27.

First, a conductor segment 30 is prepared by bending into a general U shape a short length of a copper wire material having a circular cross section covered with an electrically-insulating coating. As shown in FIG. 25, this conductor segment 30 is constituted by a general U shape in which a pair of straight portions 30a are linked by a turn portion 30b.

The stator core 15 is prepared by laminating a predetermined number of long, thin magnetic steel plates in which slots 15a are formed at a predetermined pitch, bending the laminated body into an annular shape with the openings of the slots 15a facing an inner circumferential side, and welding first and second end surfaces of the annular shape. In this stator core 15, the slots 15a, which have grooves lying in an axial direction, are formed at a ratio of two per phase per pole. In other words, ninety-six slots 15a are arranged circumferentially on an inner circumferential side of the stator core 15, the number of magnetic poles in the rotor 7 being sixteen.

Moreover, to facilitate explanation, Slot Numbers from 1 to 96 are allocated to each of the slots 15a as shown in FIG. 26, and the positions in each of the slots 15a in which the conductor segments 30 are housed are designated Address 1, Address 2, Address 3, and Address 4, respectively, from an inner circumferential side.

Conductor segments 30 are inserted two at a time from a front end of the stator core 15 into slot pairs separated by six slots (slot pairs including Slot Numbers n and (n+6)). Here, in each of the slot pairs, a first conductor segment 30 is inserted into Address 1 in slot 15a Number n and into Address 2 in slot 15a Number (n+6) and a second conductor segment 30 is inserted into Address 3 in slot 15a Number n and into Address 4 in slot 15a Number (n+6). The free end portions of the conductor segments 30 extending outward at the rear end from Address 1 and Address 2 of each of the slot pairs are bent in a clockwise direction in FIG. 26, and the free end portions of the conductor segments 30 extending outward at the rear end from Address 3 and Address 4 of each of the slot pairs are bent in a counterclockwise direction in FIG. 26. Here, four straight portions 30a are housed in each of the slots 15a so as to line up in one row in a radial direction.

Next, the free end portions 30c of the conductor segments 30 extending outward at the rear end from Address 1 in slot 15a Number n and the free end portions 30c of the conductor segments 30 extending outward at the rear end from Address 4 in slot 15a Number (n+6) are stacked in a radial direction and joined by welding, etc. Similarly, the free end portions 30c of the conductor segments 30 extending outward at the rear end from Address 2 in slot 15a Number n and the free end portions 30c of the conductor segments 30 extending outward at the rear end from Address 3 in slot 15a Number (n+6) are stacked in a radial direction and joined by welding, etc. Thus, two two-turn lap windings are formed, the lap windings being wound into every sixth slot 15a.

Now, at the rear end of the stator core 15, distant-address joint portions $31_{1-4}$ joining the free end portions 30c of the conductor segments 30 extending outward at the rear end from Address 1 and Address 4 in each of the slot pairs surround near-address joint portions $31_{2-3}$ joining the free end portions 30c of the conductor segments 30 extending outward at the rear end from Address 2 and Address 3 as shown in FIGS. 27 to 29. Thus, the two joint portions $31_{1-4}$ and $31_{2-3}$ are arranged into two layers in an axial direction.

Similarly, at the front end of stator core 15, the turn portions 30b of the conductor segments 30 extending outward at the front end from Address 1 and Address 2 in each of the slot pairs and the turn portions 30b of the conductor segments 30 extending outward at the front end from Address 3 and Address 4 are arranged so as to overlap in a radial direction.

Next, for example, the free end portion 30c of the conductor segment 30 extending at the rear end from Address 2 of slot 15a Number 91 and the free end portion 30c of conductor segment 30 of slot 15a Number 1 extending at the rear end from Address 4 are joined. Thus, as shown in FIG. 26, a first four-turn winding phase portion 161 is prepared by connecting two two-turn lap windings in series. The free end portion 30c of the conductor segment 30 extending outward at the rear end from Address 1 of slot 15a Number 91 becomes an output wire (O) of the first winding phase portion 161, and the free end portion 30c of the conductor segment 30 extending outward at the rear end from Address 3 of slot 15a Number 1 becomes a neutral-point lead wire (N) of the first winding phase portion 161.

Here, only the first winding phase portion 161, which is installed in a first slot group including Slot Numbers 1, 7, etc., through 91, is shown in FIG. 26, but second to sixth winding phase portions 161 are similarly installed in a second slot group including Slot Numbers 2, 8, etc., through 92, a third slot group including Slot Numbers 3, 9, etc., through 93, a fourth slot group including Slot Numbers 4, 10, etc., through 94, a fifth slot group including Slot Numbers 5, 11, etc., through 95, and a sixth slot group including Slot Numbers 6, 12, etc., through 96, respectively.

A first three-phase alternating-current winding is prepared by connecting together each of the neutral-point lead wires (N) of the first, third, and fifth winding phase portions 161 installed in the first slot group including Slot Numbers 1, 7, etc., through 91, the third slot group including Slot Numbers 3, 9, etc., through 93, and the fifth slot group including Slot Numbers 5, 11, etc., through 95, respectively, to form the first, third, and fifth winding phase portions 161 into a Y connection (an alternating-current connection). Similarly, a second three-phase alternating-current winding is prepared by connecting together each of the neutral-point lead wires (N) of the second, fourth, and sixth winding phase portions 161 installed in the second slot group including Slot Numbers 2, 8, etc., through 92, the fourth slot group including Slot Numbers 4, 10, etc., through 94, and the sixth slot group including Slot Numbers 6, 12, etc., through 96, respectively, to form the second, fourth, and sixth winding phase portions 161 into a Y connection (an alternating-current connection). The stator winding 16, which is composed of the first and second three-phase alternating-current windings constructed in this manner, is installed in the stator core 15 to obtain the stator 8.

The stator 8 prepared in this manner is mounted to an automotive alternator, the first and second three-phase alternating-current windings each being connected to different rectifiers 12. Thus, outputs from the first and second three-phase alternating current windings are subjected to three-phase full-wave rectification in different rectifiers 12, then combined and output.

In the stator 8 constructed in this manner, as shown in FIGS. 27 to 29, the distant-address joint portions $31_{1-4}$ and the near-address joint portions $31_{2-3}$ joining together the free end portions 30c of the conductor segments 30 are arranged at a predetermined pitch in a circumferential direction so as to form two layers in an axial direction, constituting a rear-end coil end group 16r. Moreover, although not shown, the turn portions 30b of the conductor segments 30 are arranged at a predetermined pitch so as to line up in single rows separated by a predetermined distance in a radial direction and to form two rows in a circumferential direction, constituting a front-end coil end group 16f.

In the automotive alternator constructed in this manner, an electric current is supplied from a battery (not shown) through the brushes 10 and the slip rings 9 to the field winding 13, generating a magnetic flux. The first claw-shaped magnetic poles 22 on the first pole core 20 are magnetized into North-seeking (N) poles by this magnetic flux, and the second claw-shaped magnetic poles 23 on the second pole core 21 are magnetized into South-seeking (S) poles.

At the same time, the pulley 4 is driven by an engine and the rotor 7 is rotated by the shaft 6. A rotating magnetic field is applied to the stator core 15 due to the rotation of the rotor 7, generating an electromotive force in the stator winding 16. Then, the alternating electromotive force generated in the stator winding 16 is converted into direct current by the rectifiers 12 and the magnitude of the output voltage thereof is adjusted by the regulator 18, recharging the battery.

Now, the field winding 13, the stator winding 16, the rectifiers 12, and the regulator 18 constantly generate heat during power generation.

Thus, in order to dissipate the heat generated by power generation, front-end and rear-end air intake apertures 1a and 2a are disposed through axial end surfaces of the front bracket 1 and the rear bracket 2, and front-end and rear-end air discharge apertures 1b and 2b are disposed through radial side surfaces of the front bracket 1 and the rear bracket 2 so as to face coil end groups 16f and 16r of the stator winding 16.

Thus, the fans 5 are rotated and driven together with the rotation of the rotor 7, and cooling airflow channels are formed in which external air is sucked inside the case 3 through the front-end and rear-end air intake apertures 1a and 2a, flows axially towards the rotor 7, is then deflected centrifugally by the fans 5, thereafter crosses the coil end groups 16f and 16r, and is discharged outside through the front-end and rear-end air discharge apertures 1b and 2b. As a result of a pressure difference between a front end and a rear end of the rotor 7, a cooling airflow channel is also formed in which cooling air flows through the inside of the rotor 7 from the front end to the rear end.

As a result, heat generated in the stator winding 16 is dissipated from the coil end groups 16f and 16r to the cooling airflows, suppressing temperature increases in the stator 8. Heat generated in the rectifier 12 and the regulator 18 is dissipated to a cooling airflow by means of the rectifier heat sink 12a and the brush holder heat sink 17, thereby suppressing temperature increases in the rectifier 12 and the regulator 18. In addition, heat generated in the field winding 13 is dissipated to the cooling airflow which flows through the inside of the rotor 7, thereby suppressing temperature increases in the rotor 7.

In the first conventional stator 8 described above, because the stator winding 16 is prepared by installing a large number of the conductor segments 30 in the stator core 15 and joining the free end portions of the conductor segments 30, one problem has been that the number of joints is large, causing assembly of the stator winding 16 to deteriorate significantly. The joint portions $31_{1-4}$ and $31_{2-3}$ joining the conductor segments 30 are also softened by welding, causing rigidity of the stator winding 16 to deteriorate. Thus, another problem is that magnetic noise increases when rigidity of the stator 8 has deteriorated and the stator 8 is mounted to an automotive alternator.

In order to solve such problems, a stator winding construction has been proposed by the present applicants in Japanese Patent Non-Examined Laid-Open No. 11-361286, for example, enabling assembly of the stator winding to be improved and reductions in rigidity of the stator winding due to welding to be suppressed by preparing a stator winding using continuous conductor wires, thereby reducing the number of joints in the stator winding.

Next, a conventional stator construction using a stator winding prepared using continuous conductor wires will be explained.

FIG. 30 is a longitudinal section showing a second conventional automotive alternator, and FIG. 31 is a rear end elevation schematically showing a first winding phase portion of a stator winding of a stator mounted to the second conventional automotive alternator. In FIG. 31, solid lines indicate rear-end wiring, broken lines indicate front-end wiring, and black circles indicate joint portions. FIG. 32 is a diagram schematically showing a rear-end portion of the stator in the second conventional automotive alternator viewed from a circumferential direction, FIG. 33 is a side elevation showing the rear-end portion of the stator mounted to the second conventional automotive alternator viewed from radially outside, and FIG. 34 is an end elevation showing the rear-end portion of the stator mounted to the second conventional automotive alternator viewed from axially outside. Moreover, in FIG. 30, the shapes of coil ends are represented schematically.

In FIG. 30, a stator 8A has a stator winding 16A prepared using continuous conductor wires 32 installed in the stator core 15.

A winding construction of a first winding phase portion 162 of the stator winding 16A will now be explained in detail with reference to FIG. 31. Moreover, the continuous conductor wires 32 are prepared from a copper wire material having a rectangular cross section coated with an electrical insulator.

The first winding phase portion 162 is constituted by first to sixth winding sub-portions 34 to 39 each composed of one continuous conductor wire 32. The first winding sub-portion 34 is constructed by wave winding one continuous conductor wire 32 into every sixth slot from Slot Numbers 1 to 91 so as to alternately occupy Address 2 and Address 1 in the slots 15a. The second winding sub-portion 35 is constructed by wave winding a continuous conductor wire 32 into every sixth slot from Slot Numbers 1 to 91 so as to alternately occupy Address 1 and Address 2 in the slots 15a. The third winding sub-portion 36 is constructed by wave winding a continuous conductor wire 32 into every sixth slot from Slot Numbers 1 to 91 so as to alternately occupy Address 4 and Address 3 in the slots 15a. The fourth winding sub-portion 37 is constructed by wave winding a continuous conductor wire 32 into every sixth slot from Slot Numbers 1 to 91 so as to alternately occupy Address 3 and Address 4 in the slots 15a. The fifth winding sub-portion 38 is constructed by wave winding a continuous conductor wire 32 into every sixth slot from Slot Numbers 1 to 91 so as to alternately occupy Address 6 and Address 5 in the slots 15a. The sixth winding sub-portion 39 is constructed by wave winding a continuous conductor wire 32 into every sixth slot from Slot Numbers 1 to 91 so as to alternately occupy Address 5 and Address 6 in the slots 15a. In each of the slots 15a, the six continuous conductor wires 32 are arranged so as to line up in one row in a radial direction with longitudinal axes of their rectangular cross sections aligned radially.

At the rear end of the stator core 15, a first end portion 35a of the second winding sub-portion 35 extending outward from Address 1 of Slot Number 1 and a second end portion 39b of the sixth winding sub-portion 39 extending outward from Address 6 of Slot Number 91 are joined, a first end portion 37a of the fourth winding sub-portion 37 extending outward from Address 3 of Slot Number 1 and a second end portion 35b of the second winding sub-portion 35 extending outward from Address 2 of Slot Number 91 are joined, and a first end portion 39a of the sixth winding sub-portion 39 extending outward from Address 5 of Slot Number 1 and a second end portion 37b of the fourth winding sub-portion 37 extending outward from Address 4 of Slot Number 91 are joined to form a three-turn wave winding in which the second, fourth, and sixth winding sub-portions 35, 37, and 39 are connected in series.

At the front end of the stator core 15, a first end portion 34a of the first winding sub-portion 34 extending outward from Address 2 of Slot Number 1 and a second end portion 36b of the third winding sub-portion 36 extending outward from Address 3 of Slot Number 91 are joined, a first end portion 36a of the third winding sub-portion 36 extending outward from Address 4 of Slot Number 1 and a second end portion 38b of the fifth winding sub-portion 38 extending outward from Address 5 of Slot Number 91 are joined, and a first end portion 38a of the fifth winding sub-portion 38 extending outward from Address 6 of Slot Number 1 and a second end portion 34b of the first winding sub-portion 34 extending outward from Address 1 of Slot Number 91 are joined to form a three-turn wave winding in which the first, third, and fifth winding sub-portions 34, 36, and 38 are connected in series.

A portion of the continuous conductor wire 32 of the first winding sub-portion 34 extending outward at the rear end of the stator core 15 from Slot Numbers 49 and 55 is cut, and a portion of the continuous conductor wire 32 of the second winding sub-portion 35 extending outward at the rear end of the stator core 15 from Slot Numbers 55 and 61 is cut. A first cut end 34c of the first winding sub-portion 34 and a first cut end 35c of the second winding sub-portion 35 are joined to form a six-turn first winding phase portion 162 in which the first to sixth winding sub-portions 34 to 39 are connected in series.

Moreover, a second cut end 34d of the first winding sub-portion 34 and a second cut end 35d of the second winding sub-portion 35 become an output wire (O) and a neutral-point lead wire (N), respectively, of the first winding phase portion 162.

Here, only the first winding phase portion 162, which is installed in a first slot group including Slot Numbers 1, 7, etc., through 91, is shown in FIG. 31, but second to sixth winding phase portions 162 are similarly installed in a second slot group including Slot Numbers 2, 8, etc., through 92, a third slot group including Slot Numbers 3, 9, etc., through 93, a fourth slot group including Slot Numbers 4, 10, etc., through 94, a fifth slot group including Slot Numbers 5, 11, etc., through 95, and a sixth slot group including Slot Numbers 6, 12, etc., through 96, respectively.

A first three-phase alternating-current winding is prepared by connecting together each of the neutral-point lead wires (N) of the first, third, and fifth winding phase portions 162 installed in the first slot group including Slot Numbers 1, 7, etc., through 91, the third slot group including Slot Numbers 3, 9, etc., through 93, and the fifth slot group including Slot Numbers 5, 11, etc., through 95, respectively, to form the first, third, and fifth winding phase portions 162 into a Y connection (an alternating-current connection). Similarly, a second three-phase alternating-current winding is prepared by connecting together each of the neutral-point lead wires (N) of the second, fourth, and sixth winding phase portions 162 installed in the second slot group including Slot Numbers 2, 8, etc., through 92, the fourth slot group including Slot Numbers 4, 10, etc., through 94, and the sixth sot group including Slot Numbers 6, 12, etc., through 96, respectively, to form the second, fourth, and sixth winding phase portions 162 into a Y connection (an alternating-current connection). The stator winding 16A, which is composed of the first and second three-phase alternating-current windings constructed in this manner, is installed in the stator core 15 to obtain the stator 8A.

The first and second three-phase alternating current windings are each connected to separate rectifiers 12, and the direct-current outputs from each of the rectifiers 12 are connected in parallel and combined.

In the stator 8A constructed in this manner, as shown in FIGS. 32 to 34, turn portions 32a of the continuous conductor wires 32 are arranged at a predetermined pitch so as to line up in single rows separated by a predetermined distance from each other in a radial direction and to form three rows in a circumferential direction, constituting a rear-end coil end group 16r. In a connection portion of the continuous conductor wires 32 in the rear-end coil end group 16r (a portion in which the end portions of the continuous conductor wires 32 are joined together), a first near-address joint portion $31_{2-3}$ joining the end portions of the continuous conductor wires 32 extending outward from Address 2 and Address 3 of slot pairs separated by six slots and a second near-address joint portion $31_{4-5}$ joining the end portions of the continuous conductor wires 32 extending outward from Address 4 and Address 5 of the same slot pair line up in a radial direction, and a distant-address joint portion $31_{1-6}$ joining the end portions of the continuous conductor wires 32 extending outward from Address 1 and Address 6 of the same slot pair is arranged so as to surround the first and second near-address joint portions $31_{2-3}$ and $31_{4-5}$ that are lined up in the radial direction. Six sets of the three types of joint portions $31_{2-3}$, $31_{4-5}$, and $31_{1-6}$ constructed in this manner are arranged at a pitch of one slot in a circumferential direction.

Moreover, a front-end coil end group 16f is also constructed similarly.

Here, each of the continuous conductor wires 32 constituting the first to sixth winding sub-portions 34 to 39 is installed in a wave winding so as to extend outward from any given slot 15a at an end surface of the stator core 15, fold over, and enter a slot 15a six slots away. Each of the continuous conductor wires 32 is installed in every sixth slot so as to alternately occupy an inner layer and an outer layer in a slot depth direction (a radial direction).

The turn portions 32a of the continuous conductor wires 32 that extend outward from the end surfaces of the stator core 15 and fold over form coil ends. Thus, at first and second ends of the stator core 15, the turn portions 32a, which are formed into a substantially uniform shape, are separated from each other in a circumferential direction and a radial direction and are arranged neatly in a circumferential direction in three layers to form the coil end groups 16f and 16r.

Next, a construction of a winding assembly used in the stator winding 16A of the second conventional stator 8A will be explained with reference to FIGS. 35A to 37.

FIGS. 35A and 35B are an end elevation and a side elevation, respectively, showing a winding assembly used in the stator winding described in Japanese Patent Non-Examined Laid-Open No. 11-361286, for example. FIG. 36 is a perspective showing part of a continuous conductor wire constituting the winding assembly shown in FIGS. 35A and 35B, and FIG. 37 is a diagram explaining arrangement of continuous conductor wires constituting the winding assembly shown in FIGS. 35A and 35B.

A winding assembly 33 is formed by arranging twelve continuous conductor wires 32 composed of a copper wire material having a rectangular cross section coated with an electrical insulator at a pitch of one slot on a plane and folding the twelve continuous conductor wires 32 simultaneously.

Thus, as shown in FIG. 36, each of the continuous conductor wires 32 is formed by bending into a planar pattern in which straight portions 32b linked by turn portions 32a are arranged at a pitch of six slots (6P). Adjacent pairs of the straight portions 32b are offset by the turn portions 32a by a width (w) of the continuous conductor wires 32 in a direction perpendicular to the direction of disposal of the straight portions 32b. Pairs of the continuous conductor wires 32 are formed by arranging two of the continuous conductor wires 32 formed in this pattern so as to be offset by a pitch of six slots with straight portions 32b stacked as shown in FIG. 37, and the winding assembly 33 shown in FIG. 35 is constructed by arranging six of these pairs so as to be offset by a pitch of one slot from each other.

Three winding assemblies 33 constructed in this manner are stacked radially and installed in the stator core 15 such that each of the pairs of straight portions 32b are inserted into each of the slots 15a. The stator 8A, in which is the stator winding 16A is installed in the stator core 15, is obtained by joining the first and second ends of each of the continuous conductor wires 32 of the winding assembly 33 based on the connection method shown in FIG. 31.

In the second conventional stator 8A constructed in this manner, because the stator winding 16A is prepared by mounting to the stator core 15 the winding assemblies 33 prepared using the continuous conductor wires 32, and joining together end portions of the continuous conductor wires 32, the number of joints is reduced significantly compared to the first conventional stator 8, significantly improving assembly of the stator winding 16A. Furthermore, even if the joint portions $31_{2-3}$, $31_{4-5}$, and $31_{1-6}$ are softened by welding, reductions in the rigidity of the stator winding 16A are suppressed because the number of joint portions is small. Thus, reductions in rigidity of the stator 8A as a whole are suppressed, and when the stator 8A is mounted to an automotive alternator, increases in magnetic noise can be suppressed.

In the first stator 8 used in a conventional automotive alternator, as described above, the first stator winding 16 is prepared by inserting the conductor segments 30 formed into the general U shape two at a time into each of the slot pairs separated by six slots and joining together the free end portions 30c of the conductor segments 30. In the second stator 8A, the second stator winding 16A is prepared by winding a plurality of the continuous conductor wires 32 into a wave shape so as to alternately occupy an inner layer and an outer layer in every sixth slot 15a and joining together end portions of the continuous conductor wires 32.

Now, joining of the free end portions 30c of the conductor segments 30 and joining of the end portions of the continuous conductor wires 32 are performed by TIG welding and are accompanied by increases in resistance values in the joint portions 31 as a result of contamination by impurities during joining. Thus, the generation of heat in the joint portions 31 is at its greatest during energization of the first and second stator windings 16 and 16A. Furthermore, the electrically-insulating coating is removed from the joint portions 31, making it necessary to ensure electrical insulation between the brackets 1 and 2 and the joint portions 31 and electrical insulation among the joint portions 31.

In the first conventional stator 8, because the distant-address joint portions $31_{1-4}$ and the near-address joint portions $31_{2-3}$ are arranged at a predetermined pitch in a circumferential direction so as to stack up in two layers in an axial direction and constitute the rear-end coil end group 16r, axial height of the rear-end coil end group 16r is raised, and the near-address joint portions $31_{2-3}$ are covered by the distant-address joint portions $31_{1-4}$, becoming less likely to be exposed to the cooling airflows blown by the fans 5. Thus, some problems have been that reductions in the size of the first stator 8 are prevented, and cooling of the first stator winding 16 deteriorates.

In an automotive alternator mounted with this first stator 8, the following problems also arise.

First, the automotive alternator increases in size with any increase in the size of the first stator 8. It is necessary to ensure clearance between the distant-address joint portions $31_{1-4}$ and the near-address joint portions $31_{2-8}$ and between the distant-address joint portions $31_{1-4}$ and the rear bracket 2 in order to ensure electrical insulation among the joint portions $31_{1-4}$ and $31_{2-3}$ and the rear bracket 2, and raising the axial height of the coil end group 16r leads to additional increases in the size of the automotive alternator. In addition, ventilation resistance increases, reducing the cooling airflow rate and increasing wind noise.

In addition, since the near-address joint portions $31_{2-3}$ are covered by the distant-address joint portions $31_{1-4}$ and are less likely to be exposed to the cooling airflows blown by the fans 5, the temperature of the near-address joint portions $31_{2-3}$ rises, leading to deterioration of the electrically-insulating coating on the conductor segments 30, and there is a risk that poor insulation will arise among the conductor segments 30, and that a decline in output will occur.

Furthermore, in the connection portion of the second conventional stator 8A, because the first near-address joint portion $31_{2-3}$ joining the end portions of the continuous conductor wires 32 extending outward from Address 2 and Address 3 of the slots 15a and the second near-address joint portion $31_{4-5}$ joining the end portions of the continuous conductor wires 32 extending outward from Address 4 and Address 5 of the slots 15a line up in a radial direction, and the distant-address joint portion $31_{1-6}$ joining together the end portions of the continuous conductor wires 32 extending outward from Address 1 and Address 6 of the slots 15a is constructed so as to surround an outer circumferential side of the first and second near-address joint portions $31_{2-3}$ and $31_{4-5}$ that are lined up in the radial direction, the axial height of the connection portion is raised, and the first and second near-address joint portions $31_{2-3}$ and $31_{4-5}$ are covered by the distant-address joint portion $31_{1-6}$, becoming less likely to be exposed to the cooling airflows blown by the fans 5. Thus, some problems have been that reductions in the size of the second stator 8A are prevented, and cooling of the second stator winding 16A deteriorates.

SUMMARY OF THE INVENTION

The present invention aims to solve the above problems and an object of the present invention is to provide a compact stator for a dynamoelectric machine having superior cooling by joining conductor wires extending outward from a slot pair separated by a predetermined number of slots, such that end portions of conductor wires extending outward from addresses of the slot pair separated by three or more addresses are joined together (a distant-address joint portion), end portions of conductor wires in the slot pair separated by two or less addresses are joined together (a near-address joint portion), and the distant-address joint portion is offset in a circumferential direction relative to the near-address joint portion, to lower an axial height of a coil end group and eliminate coverage of the near-address joint portion by the distant-address joint portion.

In order to achieve the above object, according to one aspect of the present invention, there is provided a stator for an automotive alternator including:

an annular stator core in which a plurality of slots extending axially are disposed in a circumferential direction; and a stator winding installed in the slots, the stator winding being provided with a plurality of winding sub-portions, each of the winding sub-portions including:

slot-housed portions housed in housing positions from Address 1 to Address m (m≧4) lined up in one row from an inner circumferential side to an outer circumferential side in each of the slots; and coil ends in which the slot-housed portions housed in different addresses in the slots in each slot pair separated by a predetermined number of slots are connected in series outside the slots, the coil ends including:

distant-address joint portions in which the slot-housed portions housed in addresses separated by three or more addresses in the slots in the each slot pair are joined together outside the slots; and near-address joint portions in which the slot-housed portions housed in addresses separated by two or less addresses in the slots in the each slot pair are joined together outside the slots, wherein the distant-address joint portions are disposed so as to be separated in a circumferential direction relative to the near-address joint portions.

Each of the winding sub-portions may be constructed by inserting a plurality of conductor segments into different addresses in the slots in the each slot pair, the conductor segments each being formed into a U shape, and joining together free end portions of different conductor segments among the conductor segments extending outward from the slots from different addresses in the slots in the each slot pair, joint portions joining together the free end portions of the conductor segments being constituted by the distant-address joint portions and the near-address joint portions.

The joint portions joining together the free end portions of the conductor segments may be arranged in a circumferential direction at a first end of the stator core.

Each of the winding sub-portions may each be constructed by installing one continuous conductor wire so as to occupy different addresses in the slots at intervals of the predetermined number of slots, the coil ends being constituted by:

turn portions of the continuous conductor wires in which different slot-housed portions among the slot-housed portions in the slots in the each slot pair are linked outside the slots; and joint portions joining together end portions of the continuous conductor wires in which different slot-housed portions among the slot-housed portions in the slots in the each slot pair are linked outside the slots, the joint portions joining together the end portions of the continuous conductor wires being constituted by the distant-address joint portions and the near-address joint portions.

The plurality of winding sub-portions may be constructed by installing winding assemblies in the stator core so as to be stacked in two or more layers in a slot depth direction, the winding assemblies each being formed by simultaneously folding a plurality of the continuous conductor wires, and wherein each of the winding assemblies is constructed by arranging continuous conductor wire pairs equivalent in number to the predetermined number of slots so as to be offset by a pitch of one slot from each other, each of the continuous conductor wire pairs being composed of two of the continuous conductor wires arranged so as to be offset from each other by a pitch equivalent to the predetermined number of slots and so as to stack the slot-housed portions stacked in the slot depth direction, and the two continuous conductor wires each being formed into a pattern in which the slot-housed portions are arranged at a pitch equivalent to the predetermined number of slots and adjacent pairs of the slot-housed portions linked by the turn portions are offset so as to alternately occupy different addresses in the slots.

The near-address joint portions may be arranged in a circumferential direction so as to have a uniform axial height, and each of the distant-address joint portions may be disposed between circumferentially-adjacent pairs of the near-address joint portions at the same axial height as the near-address joint portions.

The near-address joint portions may be arranged in a circumferential direction so as to have a uniform axial height, and the distant-address joint portions may be arranged in a circumferential direction at the same axial height as the near-address joint portions at a first circumferential end of a group of the near-address joint portions arranged in the circumferential direction.

The near-address joint portions may be arranged in a circumferential direction so as to have a uniform axial height, and the distant-address joint portions may be arranged in a circumferential direction at the same axial height as the near-address joint portions at first and second circumferential ends of a group of the near-address joint portions arranged in the circumferential direction.

The near-address joint portions may be arranged in at least one row in a circumferential direction, radial positions of the distant-address joint portions aligning with at least one row of the near-address joint portions arranged in the circumferential direction.

The distant-address joint portion may be formed by directly joining together extending portions of the slot-housed portions.

The distant-address joint portion may be formed by joining together extending portions of the slot-housed portions by means of a metal connection portion.

An electrically-insulating material may be interposed in at least one position selected from a group including a position between the distant-address joint portion and the near-address joint portion, a position between two of the distant-address joint portions, and a position between two of the near-address joint portions.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

The preferred embodiments of the present invention will now be explained with reference to the drawings.

Embodiment 1

Figure 1:
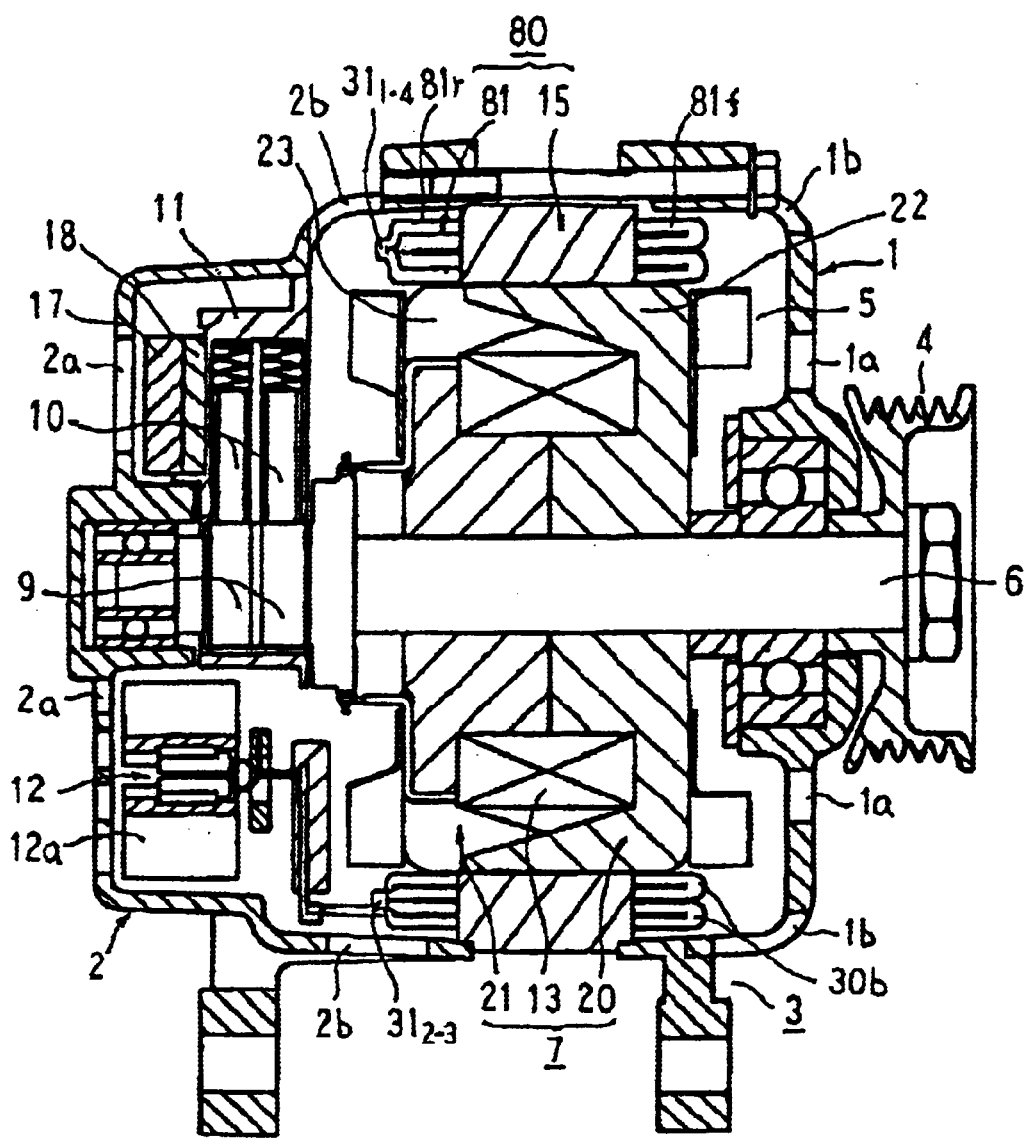
FIG. 1 is a longitudinal section showing an automotive alternator mounted with a stator according to Embodiment 1 of the present invention.
Figure 2:
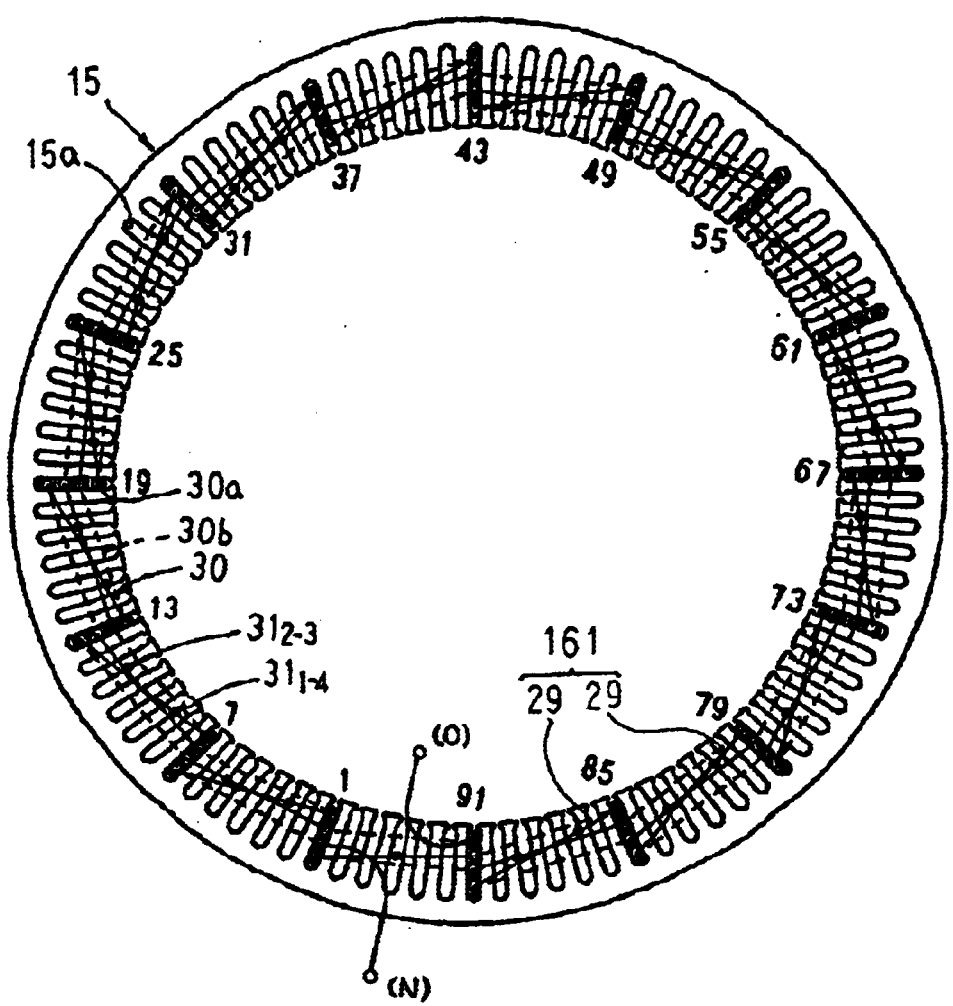
FIG. 2 is a rear end elevation schematically showing a first winding phase portion of a stator winding in the stator of the automotive alternator according to Embodiment 1 of the present invention.
Figure 3:
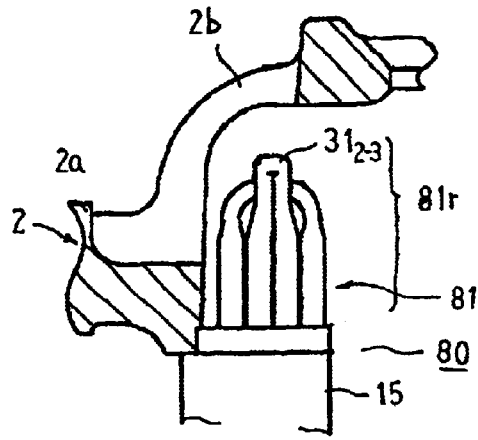
FIG. 3 is a diagram schematically showing a rear-end portion of the stator in the automotive alternator mounted with the stator according to Embodiment 1 of the present invention viewed from a circumferential direction.
Figure 4:
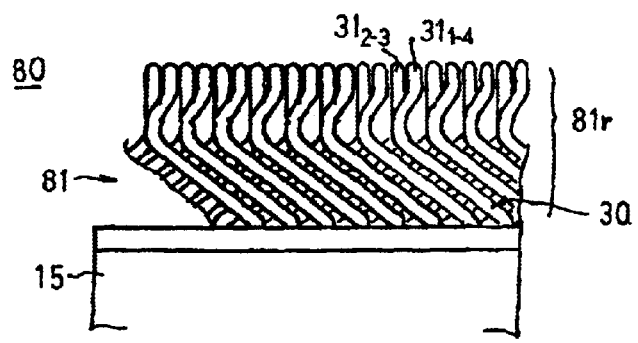
FIG. 4 is a side elevation showing the rear-end portion of the stator of the automotive alternator according to Embodiment 1 of the present invention viewed from radially outside.
Figure 5:
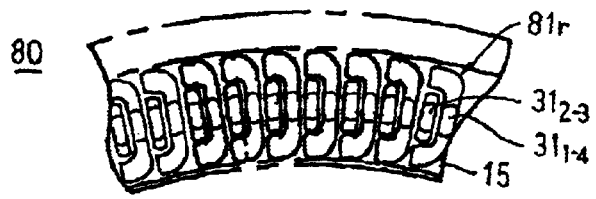
FIG. 5 is an end elevation showing the rear-end portion of the stator of the automotive alternator according to Embodiment 1 of the present invention viewed from axially outside.

FIG. 1 is a longitudinal section showing an automotive alternator mounted with a stator according to Embodiment 1 of the present invention. FIG. 2 is a rear end elevation schematically showing a first winding phase portion of a stator winding in the stator of the automotive alternator according to Embodiment 1 of the present invention. In FIG. 2, solid lines indicate rear-end wiring, broken lines indicate front-end wiring, and black circles indicate joint portions. FIG. 3 is a diagram schematically showing a rear-end portion of the stator in the automotive alternator mounted with the stator according to Embodiment 1 of the present invention viewed from a circumferential direction, FIG. 4 is a side elevation showing the rear-end portion of the stator of the automotive alternator according to Embodiment 1 of the present invention viewed from radially outside, and FIG. 5 is an end elevation showing the rear-end portion of the stator of the automotive alternator according to Embodiment 1 of the present invention viewed from axially outside. Moreover, in each of the figures, portions the same as or corresponding to those in the conventional examples shown in FIGS. 24 to 36 will be given the same numbering, and explanation thereof will be omitted. In FIG. 1, the shapes of coil ends are represented schematically.

In a stator 80 according to Embodiment 1, the conductor segments 30 and the stator core 15 are used in a similar manner to the first conventional stator 8. In the stator core 15, slots 15a, which have grooves lying in an axial direction, are formed at a ratio of two per phase per pole. In other words, ninety-six slots 15a are arranged circumferentially on an inner circumferential side of the stator core 15, the number of magnetic poles in a rotor 7 being sixteen. To facilitate explanation, Slot Numbers from 1 to 96 are allocated to each of the slots 15a as shown in FIG. 2, and the positions in each of the slots 15a in which the conductor segments 30 are housed are designated Address 1, Address 2, Address 3, and Address 4, respectively, from an inner circumferential side.

First, a specific construction of a stator winding 81 in the stator 80 will be explained.

The conductor segments 30 are inserted two at a time from a front end of the stator core 15 into slot pairs separated by six slots (slot pairs including Slot Numbers n and (n+6)). Here, in each of the slot pairs, a first conductor segment 30 is inserted into Address 1 in slot 15a Number n and into Address 2 in slot 15a Number (n+6) and a second conductor segment 30 is inserted into Address 3 in slot 15a Number n and into Address 4 in slot 15a Number (n+6). The free end portions of the conductor segments 30 extending outward at the rear end from Address 1 and Address 2 of each of the slot pairs are bent in a clockwise direction in FIG. 2, and the free end portions of the conductor segments 30 extending outward at the rear end from Address 3 and Address 4 of each of the slot pairs are bent in a counterclockwise direction in FIG. 2. Here, four straight portions 30a functioning as slot-housed portions are housed in each of the slots 15a so as to line up in one row in a radial direction.

Next, the free end portions 30c of the conductor segments 30 extending outward at the rear end from Address 1 in slot 15a Number n and the free end portions 30c of the conductor segments 30 extending outward at the rear end from Address 4 in slot 15a Number (n+6) are stacked in a radial direction and joined by welding, etc. Similarly, the free end portions 30c of the conductor segments 30 extending outward at the rear end from Address 2 in slot 15a Number n and the free end portions 30c of the conductor segments 30 extending outward at the rear end from Address 3 in slot 15a Number (n+6) are stacked in a radial direction and joined by welding, etc., so as to be offset in a circumferential direction relative to a joint portion 31 joining the free end portions 30c of the conductor segments 30 extending outward at the rear end from Address 1 and Address 4. Thus, two two-turn lap windings 29 each functioning as a winding sub-portion are formed, the lap windings being wound into every sixth slot 15a.

Next, the free end portion 30c of the conductor segment 30 extending at the rear end from Address 2 of slot 15a Number 91 and the free end portion 30c of conductor segment 30 extending at the rear end from Address 4 of slot 15a Number 1 are joined. Thus, as shown in FIG. 2, a first four-turn winding phase portion 161 is prepared by connecting two two-turn lap windings 29 in series. The free end portion 30c of the conductor segment 30 extending outward at the rear end from Address 1 of slot 15a Number 91 becomes an output wire (O) of the first winding phase portion 161, and the free end portion 30c of the conductor segment 30 extending outward at the rear end from Address 3 of slot 15a Number 1 becomes a neutral-point lead wire (N) of the first winding phase portion 161.

Here, only the first winding phase portion 161, which is installed in a first slot group including Slot Numbers 1, 7, etc., through 91, is shown in FIG. 2, but second to sixth winding phase portions 161 are similarly installed in a second slot group including Slot Numbers 2, 8, etc., through 92, a third slot group including Slot Numbers 3, 9, etc., through 93, a fourth slot group including Slot Numbers 4, 10, etc., through 94, a fifth slot group including Slot Numbers 5, 11, etc., through 95, and a sixth slot group including Slot Numbers 6, 12, etc., through 96, respectively.

A first three-phase alternating-current winding is prepared by connecting together each of the neutral-point lead wires (N) of the first, third, and fifth winding phase portions 161 installed in the first slot group including Slot Numbers 1, 7, etc., through 91, the third slot group including Slot Numbers 3, 9, etc., through 93, and the fifth slot group including Slot Numbers 5, 11, etc., through 95, respectively, to form the first, third, and fifth winding phase portions 161 into a Y connection (an alternating-current connection). Similarly, a second three-phase alternating-current winding is prepared by connecting together each of the neutral-point lead wires (N) of the second, fourth, and sixth winding phase portions 161 installed in the second slot group including Slot Numbers 2, 8, etc., through 92, the fourth slot group including Slot Numbers 4, 10, etc., through 94, and the sixth slot group including Slot Numbers 6, 12, etc., through 96, respectively, to form the second, fourth, and sixth winding phase portions 161 into a Y connection (an alternating-current connection). The stator winding 81, which is composed of the first and second three-phase alternating-current windings constructed in this manner, is installed in the stator core 15 to obtain the stator 80.

Here, at the rear end of the stator core 15, as shown in FIGS. 3 to 5, distant-address joint portions $31_{1-4}$ joining the free end portions 30c of the conductor segments 30 extending outward at the rear end from Address 1 and Address 4 in each of the slot pairs and near-address joint portions $31_{2-3}$ joining the free end portions 30c of the conductor segments 30 extending outward at the rear end from Address 2 and Address 3 in each of the slot pairs are arranged in one row in a circumferential direction so as to be separated from each other at the same axial height, constituting a rear-end coil end group 81r. Moreover, the distant-address joint portions $31_{1-4}$ and the near-address joint portions $31_{2-3}$ constitute rear-end coil ends.

Similarly, at the front end of stator core 15, turn portions 30b of the conductor segments 30 extending outward at the front end from Address 1 and Address 2 in each of the slot pairs and turn portions 30b of the conductor segments 30 extending outward at the front end from Address 3 and Address 4 in each of the slot pairs are arranged in two rows in a circumferential direction so as to form single rows in a radial direction at the same axial height, constituting a front-end coil end group 81f. Moreover, the turn portions 30b constitute front-end coil ends.

As shown in FIG. 1, the stator 80 constructed in this manner is mounted to an automotive alternator so as to be held between a front bracket 1 and a rear bracket 2 such that a uniform air gap is formed between outer circumferential surfaces of first and second claw-shaped magnetic poles 22 and 23 and an inner circumferential surface of the stator core 15, output wires (O) from the stator winding 81 being connected to rectifiers 12.

According to Embodiment 1, the distant-address joint portions $31_{1-4}$ and the near-address joint portions $31_{2-3}$ are arranged in a circumferential direction to form one row so as to be separated from each other in a circumferential direction at the same axial height and constitute the rear-end coil end group 81r, and the turn portions 30b are arranged in a circumferential direction to form two rows so as to be separated from each other in a circumferential direction and a radial direction at the same axial height and constitute the front-end coil end group 81f.

Thus, the axial height of the rear-end coil end group 81r is lower than the rear-end coil end group 16r in the first conventional stator 8, enabling reductions in the size of the stator 80. Hence, clearance between the joint portions $31_{1-4}$ and $31_{2-3}$ and the rear bracket 2 can be ensured, enabling a compact automotive alternator having superior electrical insulation to be achieved.

Furthermore, because the axial height of the front-end coil-end group 81f is lower, ventilation resistance is reduced, leading to increases in the cooling airflow rate, thereby improving cooling and enabling reductions in wind noise.

Because the distant-address joint portions $31_{1-4}$ and the near-address joint portions $31_{2-3}$ are arranged in a circumferential direction to form one row and be spaced in a circumferential direction, that is to say, because each of the joint portions $31_{1-4}$ and $31_{2-3}$ are arranged so as to be exposed when viewed from radially inside, the joint portions $31_{1\text{-}4}$ and $31_{2\text{-}3}$, which are the portions generating the most heat in the stator winding 81, are all exposed to the cooling airflows blown by the fans 5 from the inner circumferential side, and heat generated in the joint portions $31_{1\text{-}4}$ and $31_{2\text{-}3}$ is effectively dissipated to the cooling airflows, suppressing temperature increases in the joint portions $31_{1\text{-}4}$ and $31_{2\text{-}3}$. Thus, deterioration of the electrically-insulating coating of the conductor segments 30 resulting from temperature increases in the joint portions $31_{1\text{-}4}$ and $31_{2\text{-}3}$ is suppressed, providing superior electrical insulation and suppressing decreases in output resulting from temperature increases in the stator 80.

Because the distant-address joint portions $31_{1\text{-}4}$ and the near-address joint portions $31_{2\text{-}3}$ are arranged evenly in a circumferential direction to constitute the rear-end coil end group 81r, ventilation balance in the circumferential direction improves, making the temperature of the rear-end coil end group 81r uniform relative to a circumferential direction. Similarly, because the turn portions 30b are arranged in a circumferential direction to constitute the front-end coil end group 81f, ventilation balance in the circumferential direction improves, making the temperature of the front-end coil end group 81f uniform relative to the circumferential direction.

Because the conductor segments 30 are inserted into the slots 15a of the stator core 15 from the front end, the joint portions joining the free end portions 30c of the conductor segments 30 are only at the rear end of the stator core 15, simplifying the joining process.

Because the free end portions 30c of the conductor segments 30 are joined directly, separate members for joining are no longer necessary, enabling material costs to be reduced.

Moreover, in Embodiment 1 above, the conductor segments 30 are inserted into the slot pairs of the stator core 15 from the front end, but the conductor segments 30 may also be inserted into the slot pairs of the stator core 15 from the rear end. In that case, because the distant-address joint portions $31_{1\text{-}4}$ and the near-address joint portions $31_{2\text{-}3}$ are prepared by welding end portions of the conductor segments 30, the axial height of the joint portions $31_{1\text{-}4}$ and $31_{2\text{-}3}$ is higher than that of the turn portions 30b and the axial height of the rear-end coil end group constituted by the turn portions 30b is lower than the axial height of the front-end coil end group constituted by the joint portions $31_{1\text{-}4}$ and $31_{2\text{-}3}$. Thus, ventilation resistance against the cooling airflow at the rear end which is mounted with the rectifiers 12 and a regulator 18 which are heat-generating parts is reduced, enabling the rear-end cooling airflow rate to be increased. As a result, heat from the rectifiers 12 and the regulator 18 is dissipated effectively, suppressing temperature increases in the rectifiers 12 and the regulator 18.

Embodiment 2

Figure 6:
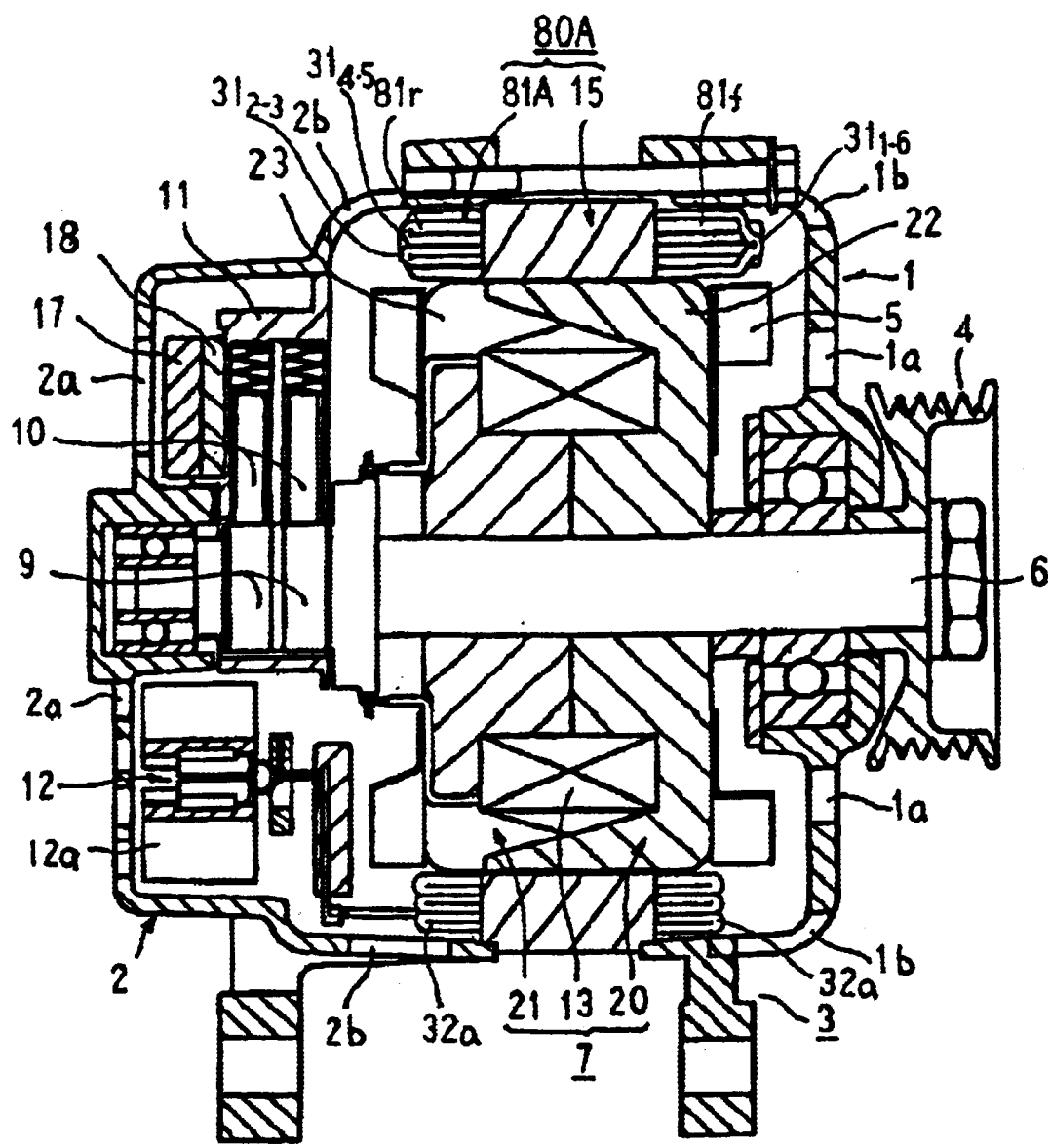
FIG. 6 is a longitudinal section showing an automotive alternator mounted with a stator according to Embodiment 2 of the present invention.
Figure 7:
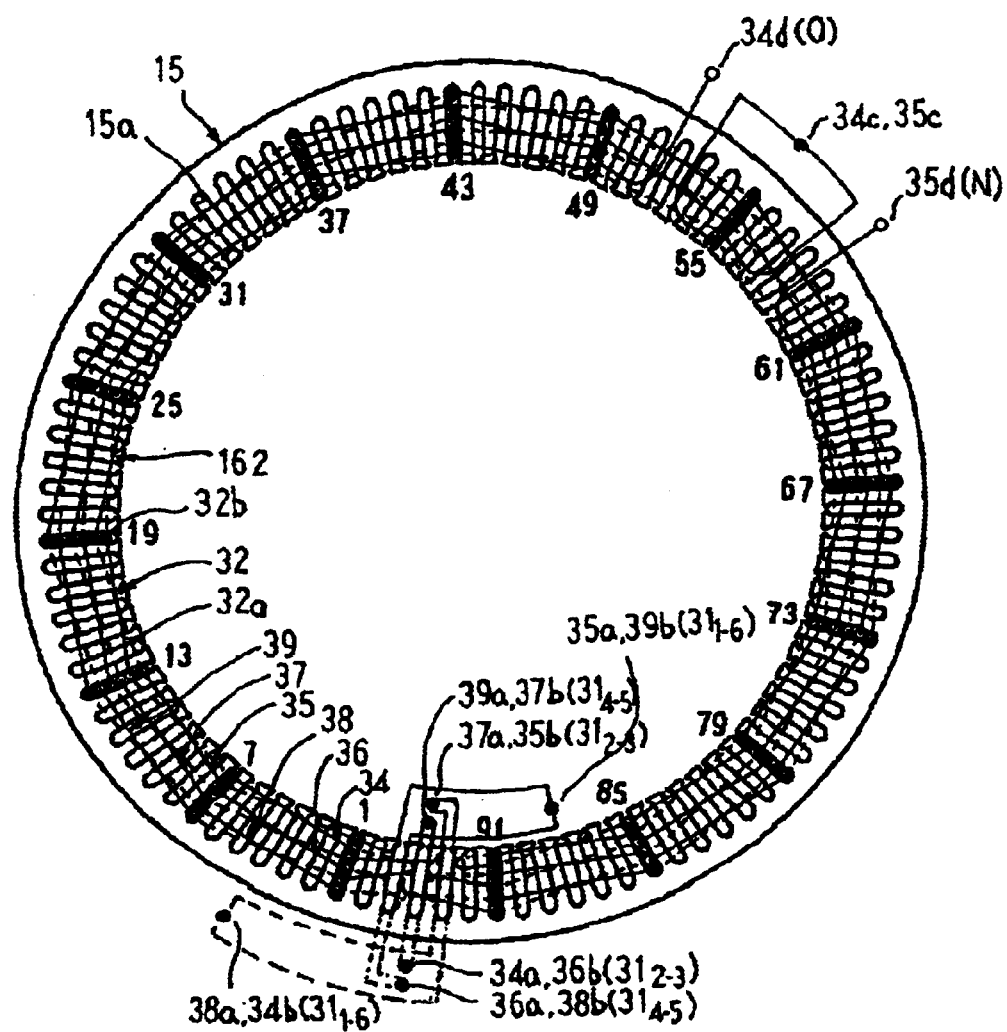
FIG. 7 is a rear end elevation schematically showing a first winding phase portion of a stator winding in the stator of the automotive alternator according to Embodiment 2 of the present invention.
Figure 8:
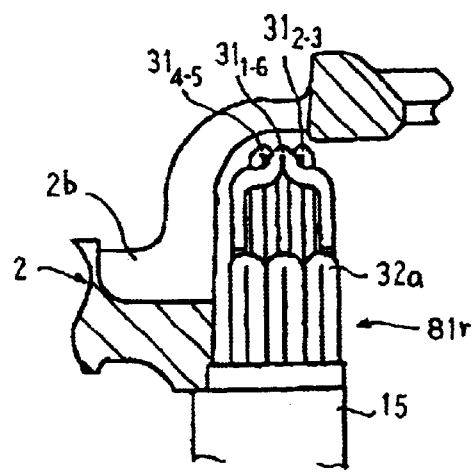
FIG. 8 is a diagram schematically showing a rear-end portion of the stator in the automotive alternator mounted with the stator according to Embodiment 2 of the present invention viewed from a circumferential direction.
Figure 9:
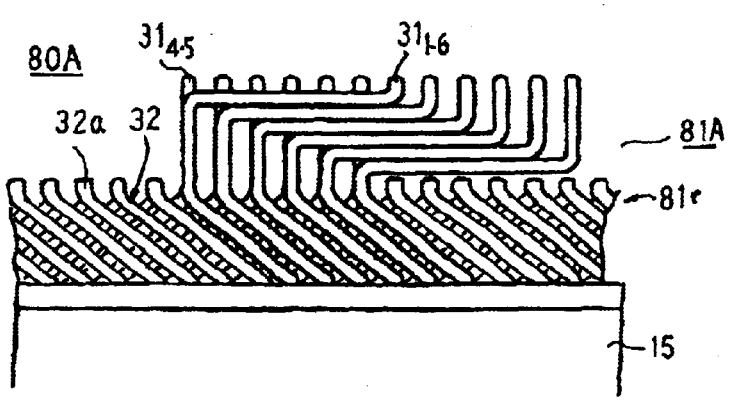
FIG. 9 is a side elevation showing the rear-end portion of the stator of the automotive alternator according to Embodiment 2 of the present invention viewed from radially outside.
Figure 10:
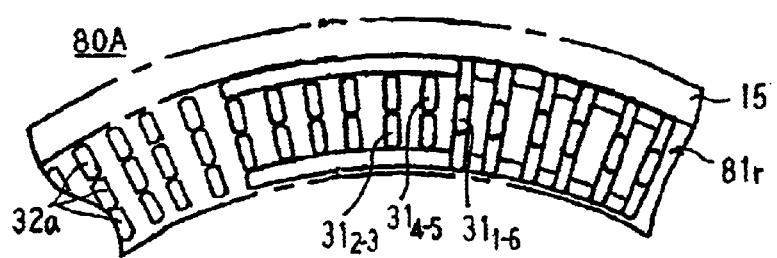
FIG. 10 is an end elevation showing the rear-end portion of the stator of the automotive alternator according to Embodiment 2 of the present invention viewed from axially outside.

FIG. 6 is a longitudinal section showing an automotive alternator mounted with a stator according to Embodiment 2 of the present invention. FIG. 7 is a rear end elevation schematically showing a first winding phase portion of a stator winding in the stator of the automotive alternator according to Embodiment 2 of the present invention. In FIG. 7, solid lines indicate rear-end wiring, broken lines indicate front-end wiring, and black circles indicate joint portions. FIG. 8 is a diagram schematically showing a rear-end portion of the stator in the automotive alternator mounted with the stator according to Embodiment 2 of the present invention viewed from a circumferential direction, FIG. 9 is a side elevation showing the rear-end portion of the stator of the automotive alternator according to Embodiment 2 of the present invention viewed from radially outside, and FIG. 10 is an end elevation showing the rear-end portion of the stator of the automotive alternator according to Embodiment 2 of the present invention viewed from axially outside. Moreover, in FIG. 6, the shapes of coil ends are represented schematically.

A stator 80A according to Embodiment 2 is constructed in a similar manner to the second conventional stator 8A by radially stacking and installing three winding assemblies 33 in the stator core 15. In the stator core 15, slots 15a, which have grooves lying in an axial direction, are formed at a ratio of two per phase per pole. In other words, ninety-six slots 15a are arranged circumferentially on an inner circumferential side of the stator core 15, the number of magnetic poles in a rotor 7 being sixteen. To facilitate explanation, Slot Numbers from 1 to 96 are allocated to each of the slots 15a as shown in FIG. 7, and the positions in each of the slots 15a in which the conductor segments 30 are housed are designated a first address, a second address, a third address, etc., through a sixth address, respectively, from an inner circumferential side.

First, a specific construction of a stator winding 81A in the stator 80A will be explained.

A first winding phase portion 162 is constituted by first to sixth winding sub-portions 34 to 39 each composed of one continuous conductor wire 32. The first winding sub-portion 34 is constructed by wave winding one continuous conductor wire 32 into every sixth slot from Slot Numbers 1 to 91 so as to alternately occupy Address 2 and Address 1 in the slots 15a. The second winding sub-portion 35 is constructed by wave winding a continuous conductor wire 32 into every sixth slot from Slot Numbers 1 to 91 so as to alternately occupy Address 1 and Address 2 in the slots 15a. The third winding sub-portion 36 is constructed by wave winding a continuous conductor wire 32 into every sixth slot from Slot Numbers 1 to 91 so as to alternately occupy Address 4 and Address 3 in the slots 15a. The fourth winding sub-portion 37 is constructed by wave winding a continuous conductor wire 32 into every sixth slot from Slot Numbers 1 to 91 so as to alternately occupy Address 3 and Address 4 in the slots 15a. The fifth winding sub-portion 38 is constructed by wave winding a continuous conductor wire 32 into every sixth slot from Slot Numbers 1 to 91 so as to alternately occupy Address 6 and Address 5 in the slots 15a. The sixth winding sub-portion 39 is constructed by wave winding a continuous conductor wire 32 into every sixth slot from Slot Numbers 1 to 91 so as to alternately occupy Address 5 and Address 6 in the slots 15a. In each of the slots 15a, straight portions 32b of the six continuous conductor wires 32 functioning as slot-housed portions are arranged so as to line up in one row in a radial direction with longitudinal axes of their rectangular cross sections aligned radially.

At the rear end of the stator core 15, a first end portion 35a of the second winding sub-portion 35 extending outward from Address 1 of Slot Number 1 and a second end portion 39b of the sixth winding sub-portion 39 extending outward from Address 6 of Slot Number 91 are joined, a first end portion 37a of the fourth winding sub-portion 37 extending outward from Address 3 of Slot Number 1 and a second end portion 35b of the second winding sub-portion 35 extending outward from Address 2 of Slot Number 91 are joined, and a first end portion 39a of the sixth winding sub-portion 39 extending outward from Address 5 of Slot Number 1 and a second end portion 37b of the fourth winding sub-portion 37 extending outward from Address 4 of Slot Number 91 are joined to form a three-turn wave winding in which the second, fourth, and sixth winding sub-portions 35, 37, and 39 are connected in series.

Here, the first near-address joint portion $31_{2\text{-}3}$ joining the first end portion 37a of the fourth winding sub-portion 37 and the second end portion 35b of the second winding sub-portion 35 and the second near-address joint portion $31_{4\text{-}5}$ joining the first end portion 39a of the sixth winding sub-portion 39 and the second end portion 37b of the fourth winding sub-portion 37 are lined up in one row in a radial direction so as to be separated from each other at the same axial height.

After extending outward from Address 1 of slot 15a Number 1, the first end portion 35a of the continuous conductor wire 32 constituting the second winding sub-portion 35 bends and extends for a predetermined distance parallel to the end surface of the stator core 15 in a counterclockwise direction in FIG. 7, then bends axially outward, and in addition bends radially outward. After extending outward from Address 6 of slot 15a Number 91, the second end portion 39b of the continuous conductor wire 32 constituting the sixth winding sub-portion 39, bends and extends for a predetermined distance parallel to the end surface of the stator core 15 in a counterclockwise direction in FIG. 7, then bends axially outward, and in addition bends radially inward. The first end portion 35a of the continuous conductor wire 32 constituting the second winding sub-portion 35 and the second end portion 39b of the continuous conductor wire 32 constituting the sixth winding sub-portion 39 are joined. Thus, the distant-address joint portion $31_{1\text{-}6}$ joining the first end portion 35a of the second winding sub-portion 35 and the second end portion 39b of the sixth winding sub-portion 39 is arranged so as to be offset by six slots in a counterclockwise direction in FIG. 7 at the same axial height as the first and second near-address joint portions $31_{2\text{-}3}$ and $31_{4\text{-}5}$ which line up in a radial direction.

At the front end of the stator core 15, a first end portion 34a of the first winding sub-portion 34 extending outward from Address 2 of Slot Number 1 and a second end portion 36b of the third winding sub-portion 36 extending outward from Address 3 of Slot Number 91 are joined, a first end portion 36a of the third winding sub-portion 36 extending outward from Address 4 of Slot Number 1 and a second end portion 38b of the fifth winding sub-portion 38 extending outward from Address 5 of Slot Number 91 are joined, and a first end portion 38a of the fifth winding sub-portion 38 extending outward from Address 6 of Slot Number 1 and a second end portion 34b of the first winding sub-portion 34 extending outward from Address 1 of Slot Number 91 are joined to form a three-turn wave winding in which the first, third, and fifth winding sub-portions 34, 36, and 38 are connected in series.

Here, the first near-address joint portion $31_{2\text{-}3}$ joining the first end portion 34a of the first winding sub-portion 34 and the second end portion 36b of the third winding sub-portion 36 and the second near-address joint portion $31_{4\text{-}5}$ joining the first end portion 36a of the third winding sub-portion 36 and the second end portion 38b of the fifth winding sub-portion 38 are lined up in one row in a radial direction so as to be separated from each other at the same axial height.

After extending outward from Address 6 of slot 15a Number 1, the first end portion 38a of the continuous conductor wire 32 constituting the fifth winding sub-portion 38 bends and extends for a predetermined distance parallel to the end surface of the stator core 15 in a clockwise direction in FIG. 7, then bends axially outward, and in addition bends radially inward. After extending outward from Address 1 of slot 15a Number 91, the second end portion 34b of the continuous conductor wire 32 constituting the first winding sub-portion 34 bends and extends for a predetermined distance parallel to the end surface of the stator core 15 in a clockwise direction in FIG. 7, then bends axially outward, and in addition bends radially outward. The first end portion 38a of the continuous conductor wire 32 constituting the fifth winding sub-portion 38 and the second end portion 34b of the continuous conductor wire 32 constituting the first winding sub-portion 34 are joined. Thus, the distant-address joint portion $31_{1\text{-}6}$ joining the first end portion 38a of the fifth winding sub-portion 38 and the second end portion 34b of the first winding sub-portion 34 is arranged so as to be offset by six slots in a clockwise direction in FIG. 7 at the same axial height as the first and second near-address joint portions $31_{2\text{-}3}$ and $31_{4\text{-}5}$ which line up in a radial direction.

A portion of the continuous conductor wire 32 of the first winding sub-portion 34 extending outward at the rear end of the stator core 15 from Slot Numbers 49 and 55 is cut, and a portion of the continuous conductor wire 32 of the second winding sub-portion 35 extending outward at the rear end of the stator core 15 from Slot Numbers 55 and 61 is cut. A first cut end 34c of the first winding sub-portion 34 and a first cut end 35c of the second winding sub-portion 35 are joined to form a six-turn first winding phase portion 162 in which the first to sixth winding sub-portions 34 to 39 are connected in series.

Moreover, a second cut end 34d of the first winding sub-portion 34 and a second cut end 35d of the second winding sub-portion 35 become an output wire (O) and a neutral-point lead wire (N), respectively, of the first winding phase portion 162.

Here, only the first winding phase portion 162, which is installed in a first slot group including Slot Numbers 1, 7, etc., through 91, is shown in FIG. 7, but second to sixth winding phase portions 162 are similarly installed in a second slot group including Slot Numbers 2, 8, etc., through 92, a third slot group including Slot Numbers 3, 9, etc., through 93, a fourth slot group including Slot Numbers 4, 10, etc., through 94, a fifth slot group including Slot Numbers 5, 11, etc., through 95, and a sixth slot group including Slot Numbers 6, 12, etc., through 96, respectively.

A first three-phase alternating-current winding is prepared by connecting together each of the neutral-point lead wires (N) of the first, third, and fifth winding phase portions 162 installed in the first slot group including Slot Numbers 1, 7, etc., through 91, the third slot group including Slot Numbers 3, 9, etc., through 93, and the fifth slot group including Slot Numbers 5, 11, etc., through 95, respectively, to form the first, third, and fifth winding phase portions 162 into a Y connection (an alternating-current connection). Similarly, a second three-phase alternating-current winding is prepared by connecting together each of the neutral-point lead wires (N) of the second, fourth, and sixth winding phase portions 162 installed in the second slot group including Slot Numbers 2, 8, etc., through 92, the fourth slot group including Slot Numbers 4, 10, etc., through 94, and the sixth slot group including Slot Numbers 6, 12, etc., through 96, respectively, to form the second, fourth, and sixth winding phase portions 162 into a Y connection (an alternating-current connection). The stator winding 81A, which is composed of the first and second three-phase alternating-current windings constructed in this manner, is installed in the stator core 15 to obtain the stator 80A.

The first and second three-phase alternating current windings are each connected to separate rectifiers 12, and the direct-current outputs from each of the rectifiers are connected in parallel and combined.

In the stator 80A constructed in this manner, as shown in FIGS. 8 to 10, turn portions 32a of the continuous conductor wires 32 are arranged at a pitch of one slot so as to line up in single rows separated by a predetermined distance from each other in a radial direction and to form three rows in a circumferential direction, constituting a rear-end coil end group 81r.

In a connection portion of the continuous conductor wires 32 in the rear-end coil end group 81r (a portion where the end portions of the continuous conductor wires 32 are joined together), six pairs of first and second near-address joint portions each including a first near-address joint portion $31_{2-3}$ joining the end portions of the continuous conductor wires 32 extending outward from Address 2 and Address 3 of slot pairs separated by six slots and a second near-address joint portion $31_{4-5}$ joining the end portions of the continuous conductor wires 32 extending outward from Address 4 and Address 5 of the same slot pair are arranged at a pitch of one slot so as to form two rows in a circumferential direction and line up in single rows in a radial direction so as to be separated from each other at the same axial height. Following the six pairs of first and second near-address joint portions $31_{2-3}$ and $31_{4-5}$, six distant-address joint portions $31_{1-6}$ joining end portions of the continuous conductor wires 32 extending outward from Address 1 and Address 6 of slot pairs separated by six slots are arranged at a pitch of one slot in one row in a circumferential direction at the same axial height as the first and second near-address joint portions $31_{2-3}$ and $31_{4-5}$. In other words, the end portions of the continuous conductor wires 32 extending outward from Address 1 and Address 6 of slot pairs separated by six slots extend outward from the slots 15a, then pass along an inner circumferential side and an outer circumferential side of the six pairs of first and second near-address joint portions $31_{2-3}$ and $31_{4-5}$, lead around in a circumferential direction parallel to the end surface of the stator core 15 until they are above the turn portions 32a, bend axially outward above the turn portions 32a, in addition bend in a radial direction, and are joined to each other. Portions of the six continuous conductor wires 32 leading around the inner circumferential side of the six pairs of first and second near-address joint portions $31_{2-3}$ and $31_{4-5}$ are offset from each other by a thickness of the continuous conductor wires 32 in an axial direction and are stacked in the axial direction. Similarly, portions of the six continuous conductor wires 32 leading around the outer circumferential side of the six pairs of first and second near-address joint portions $31_{2-3}$ and $31_{4-5}$ are offset from each other by a thickness of the continuous conductor wires 32 in an axial direction and are stacked in the axial direction. Here, the turn portions 32a and each of the three types of joint portions $31_{2-3}$, $31_{4-5}$, and $31_{1-6}$ constitute coil ends.

Moreover, the front-end coil end group 81f is constructed similarly.

Here, each of the continuous conductor wires 32 constituting the first to sixth winding sub-portions 34 to 39 is installed in a wave winding so as to extend outward from any given slot 15a at an end surface of the stator core 15, fold over, and enter a slot 15a six slots away. Each of the continuous conductor wires 32 is installed in every sixth slot so as to alternately occupy an inner layer and an outer layer in a slot depth direction (a radial direction).

As shown in FIG. 6, the stator 80A is mounted to an automotive alternator so as to be held between a front bracket 1 and a rear bracket 2 such that a uniform air gap is formed between outer circumferential surfaces of first and second claw-shaped magnetic poles 22 and 23 and an inner circumferential surface of the stator core 15, output wires (O) from the stator winding 81A being connected to the rectifiers 12.

According to Embodiment 2, in the connection portion of the stator winding 81A, because the distant-address joint portions $31_{1-6}$ joining end portions of the continuous conductor wires 32 extending outward from Address 1 and Address 6 of slot pairs separated by six slots are offset in a first circumferential direction relative to the first near-address joint portions $31_{2-3}$ joining the end portions of the continuous conductor wires 32 extending outward from Address 2 and Address 3 and the second near-address joint portions $31_{4-5}$ joining the end portions of the continuous conductor wires 32 extending outward from Address 4 and Address 5, the axial heights of the connection portions of the front-end and rear-end coil end groups 81f and 81r are lower, and the first near-address joint portions $31_{2-3}$ joining the end portions of the continuous conductor wires 32 extending outward from Address 2 and Address 3 and the second near-address joint portions $31_{4-5}$ joining the end portions of the continuous conductor wires 32 extending outward from Address 4 and Address 5 are exposed to the cooling airflows from the fans 5.

Consequently, the stator 80A according to Embodiment 2 enables reductions in size, suppresses temperature increases in the joint portions 31, and enables improvements in electrical insulation compared to the second conventional stator 8A.

Because the axial heights of the front-end and rear-end coil end groups 81f and 81r are lower, ventilation resistance is reduced, leading to increases in the cooling airflow rate, thereby improving cooling and enabling reductions in wind noise.

In Embodiment 2, because the stator winding 81A is constituted by the winding assemblies 33, which are prepared using the continuous conductor wires 32, the number of joint portions is significantly reduced compared to Embodiment 1 above, in which the conductor segments 30 were used, greatly improving the joining operation.

Because the distant-address joint portions $31_{1-6}$ pass along the inner circumferential side and the outer circumferential side of the first and second near-address joint portions $31_{2-3}$ and $31_{4-5}$, lead around until they are above the turn portions 32a, and are joined so as to make use of available space above the turn portions 32a, the operation of joining the distant-address joint portions $31_{1-6}$ is simplified.

Here, a connection construction in the connection portions of the stator winding 81A will be explained.

In Embodiment 2 above, in the connection portions of the stator winding 81A, the end portions of the continuous conductor wires 32 extending outward from Address 1 and Address 6 are joined together, the end portions of the continuous conductor wires 32 extending outward from Address 2 and Address 3 are joined together, and in addition the end portions of the continuous conductor wires 32 extending outward from Address 4 and Address 5 are joined together. By adopting this connection construction, a first three-turn winding in which the first, third, and fifth winding sub-portions 34, 36, and 38 are connected in series and a second three-turn winding in which the second, fourth, and sixth winding sub-portions 35, 37, and 39 are connected in series are constructed. Thus, in rectifier joint portions of the stator winding 81A (portions in which the stator winding 81A is joined to the rectifiers), as shown in FIG. 7, there is one joint portion linking the first and second three-turn windings per winding phase portion, enabling reductions in the number of joint portions.

Figure 11:
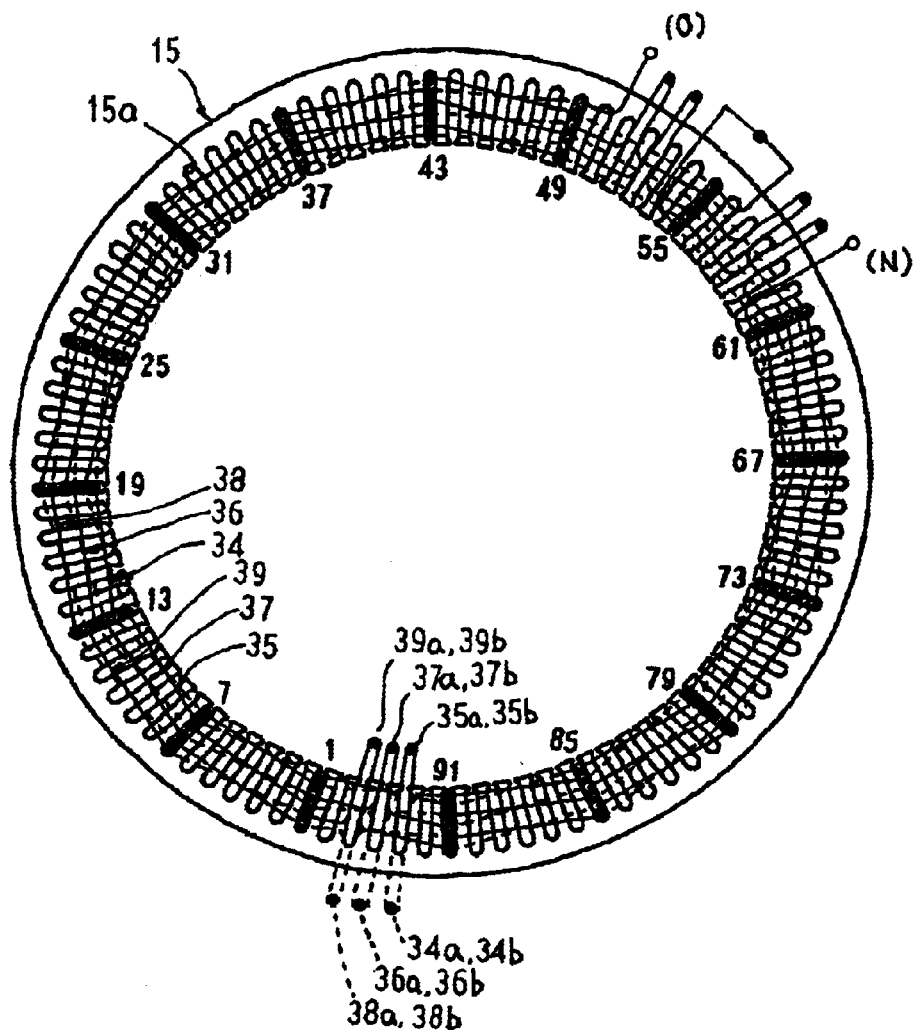
FIG. 11 is a rear end elevation explaining a relationship between a joining construction of connection portions and a joining construction of rectifier joint portions in the stator winding of the stator of the automotive alternator according to Embodiment 2 of the present invention.

On the other hand, in the connection portions of a stator winding with the connection construction in which the end portions of the continuous conductor wires extending outward from adjacent addresses of the slot pairs are joined together, single-turn first to sixth winding sub-portions 34 to 39 are constructed. Thus, in the rectifier connection portions of the stator winding, as shown in FIG. 11, there are five joint portions linking the single-turn first to sixth winding sub-portions 34 to 39 per winding phase portion.

Hence, in the connection portions of the stator winding, by adopting a connection construction in which end portions of the continuous conductor wires 32 extending outward from Address $m_1$ and Address $m_2$ of a slot pair ($m_2 \geq m_1+3$) are joined together, and end portions of the continuous conductor wires 32 extending outward from other addresses of the slot pair are joined together with the end portions of the continuous conductor wires extending outward from near addresses, the number of joint portions in the rectifier connection portions of the stator winding is reduced because the wave windings installed in the slots from Address $m_1$ to Address $m_2$ are connected in series. When the end portion of the continuous conductor wire extending outward from the innermost circumferential layer of the slot pair and the end portion of the continuous conductor wire extending outward from the outermost circumferential layer are joined together, if the joining operation is taken into consideration, a connection construction joining together the winding ends in the innermost circumferential layer and the outermost circumferential layer of the slot pair is the most effective because there is only one joint portion in the rectifier connection portions of the stator winding.

Moreover, the joint portion joining the end portions of the conductor wires extending outward from Address $m_1$ and Address $m_2$ of the slot pair ($m_2 \geq m_1+3$) is a distant-address joint portion, and the joint portions joining the end portions of the conductor wires extending outward from Address $m_1$ and Address $m_2$ ($m_1<m_2 \leq m_1+2$) of the slot pair are near-address joint portions. The conductor wires may be the conductor segments 30 or the continuous conductor wires 32.

Embodiment 3

Figure 12:
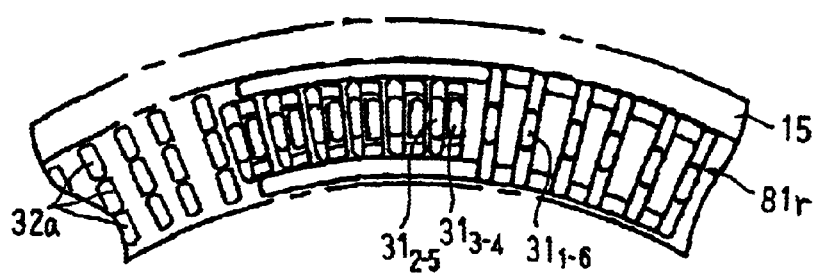
FIG. 12 is an end elevation showing the rear-end portion of the stator of the automotive alternator according to Embodiment 3 of the present invention viewed from axially outside.

In Embodiment 3, in a connection portion of the rear-end coil end group 81r, as shown in FIG. 12, the end portions of the continuous conductor wires 32 extending outward from Address 1 and Address 6 are joined together, the end portions of the continuous conductor wires 32 extending outward from Address 3 and Address 4 are joined together, and the end portions of the continuous conductor wires 32 extending outward from Address 2 and Address 5 are joined together.

Six near-address joint portions $31_{3-4}$ joining the end portions of the continuous conductor wires 32 extending outward from Address 3 and Address 4 are arranged at a pitch of one slot in a circumferential direction, six first distant-address joint portions $31_{1-6}$ joining the end portions of the continuous conductor wires 32 extending outward from Address 1 and Address 6 are arranged at a pitch of one slot in a circumferential direction following the six arranged near-address joint portions $31_{3-4}$ so as to be offset by a pitch of six slots in a first circumferential direction at the same axial height as the near-address joint portions $31_{3-4}$, and six second distant-address joint portions $31_{2-5}$ joining the end portions of the continuous conductor wires 32 extending outward from Address 2 and Address 5 are arranged at a pitch of one slot in a circumferential direction so as to be offset by a pitch of 0.5 slot in a second circumferential direction and be positioned between the near-address joint portions $31_{3-4}$ at the same axial height as the near-address joint portions $31_{3-4}$.

A connection portion of the front-end coil end group 81f is also constructed in a similar manner to that of the rear end.

Moreover, the rest of this embodiment is constructed in a similar manner to Embodiment 2 above.

According to Embodiment 3, because the first and second distant-address joint portions $31_{2-5}$ and $31_{1-6}$ are arranged so as to be offset in first and second circumferential directions relative to the near-address joint portions $31_{3-4}$, the heights of the coil end groups can be lowered in a similar manner to Embodiment 2 above.

Because the first and second distant-address joint portions $31_{1-6}$ and $31_{2-5}$ and the near-address joint portions $31_{3-4}$ are arranged so as to be offset from each other in a circumferential direction, each of the three types of joint portions $31_{1-6}$, $31_{2-5}$, and $31_{3-4}$ are exposed when viewed from a radial direction, further improving cooling of the stator when mounted to an automotive alternator.

Because the first and second distant-address joint portions $31_{1-6}$ and $31_{2-5}$ and the near-address joint portions $31_{3-4}$ are arranged in one row in a circumferential direction so as to be in the same radial position and at the same axial height, each of the joint portions can be welded in turn by setting the stator core 15 in a welding apparatus and rotating the stator core 15 at a predetermined pitch in the first circumferential direction, improving the welding operation.

Embodiment 4

Figure 13:
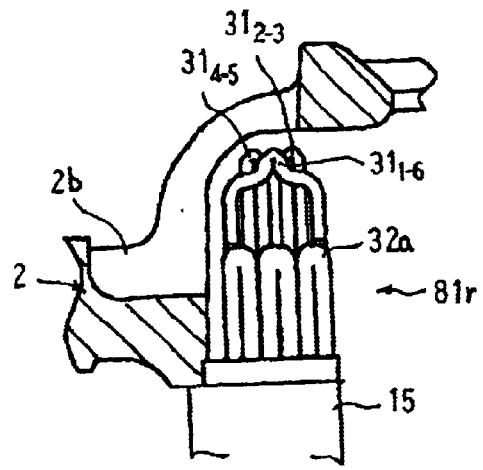
FIG. 13 is a diagram schematically showing a rear-end portion of the stator in the automotive alternator mounted with the stator according to Embodiment 4 of the present invention viewed from a circumferential direction.
Figure 14:
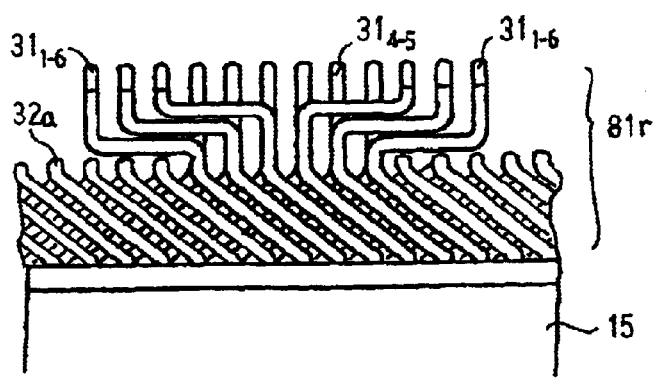
FIG. 14 is a side elevation showing the rear-end portion of the stator of the automotive alternator according to Embodiment 4 of the present invention viewed from radially outside.
Figure 15:
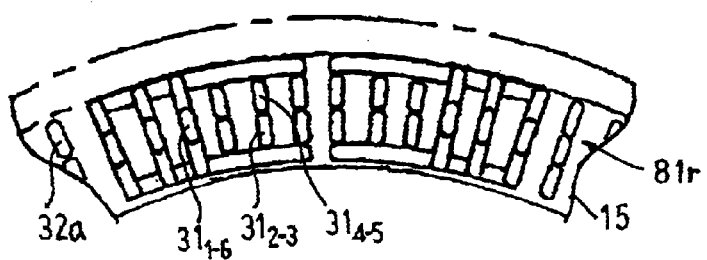
FIG. 15 is an end elevation showing the rear-end portion of the stator of the automotive alternator according to Embodiment 4 of the present invention viewed from axially outside.

FIG. 13 is a diagram schematically showing a rear-end portion of the stator in the automotive alternator mounted with the stator according to Embodiment 4 of the present invention viewed from a circumferential direction, FIG. 14 is a side elevation showing the rear-end portion of the stator of the automotive alternator according to Embodiment 4 of the present invention viewed from radially outside, and FIG. 15 is an end elevation showing the rear-end portion of the stator of the automotive alternator according to Embodiment 4 of the present invention viewed from axially outside.

In FIGS. 13 to 15, in a connection portion of the continuous conductor wires 32 in a rear-end coil end group 81r (a portion where the end portions of the continuous conductor wires 32 are joined together), six pairs of near-address joint portions each including a first near-address joint portion $31_{2-3}$ joining the end portions of the continuous conductor wires 32 extending outward from Address 2 and Address 3 of slot pairs separated by six slots and a second near-address joint portion $31_{4-5}$ joining the end portions of the continuous conductor wires 32 extending outward from Address 4 and Address 5 of the same slot pair are arranged at a pitch of one slot so as to form two rows in a circumferential direction and line up in single rows in a radial direction so as to be separated from each other at the same axial height. Six distant-address joint portions $31_{1-6}$ joining end portions of the continuous conductor wires 32 extending outward from Address 1 and Address 6 of slot pairs separated by six slots are arranged in first and second groups of three at a pitch of one slot in one row in a circumferential direction at the same axial height as the six pairs of first and second near-address joint portions $31_{2-3}$ and $31_{4-5}$ such that the first and second groups of three are disposed at first and second circumferential ends of the first and second near-address joint portions $31_{2-3}$ and $31_{4-5}$, respectively.

In other words, the end portions of the continuous conductor wires 32 extending outward from Address 1 and Address 6 of slot pairs separated by six slots extend outward from the slots 15a, then pass along an inner circumferential side and an outer circumferential side of the six pairs of first and second near-address joint portions $31_{2-3}$ and $31_{4-5}$, lead around in a circumferential direction parallel to the end surface of the stator core 15 until they are above the turn portions 32a, bend axially outward above the turn portions 32a, in addition bend in a radial direction, and are joined to each other. Portions of the first and second groups of three continuous conductor wires 32 leading around the inner circumferential side of the six pairs of first and second near-address joint portions $31_{2-3}$ and $31_{4-5}$ are offset from each other by a thickness of the continuous conductor wires 32 in an axial direction and are stacked in the axial direction. Similarly, portions of the first and second groups of three continuous conductor wires 32 leading around the outer circumferential side of the six pairs of first and second near-address joint portions $31_{2-3}$ and $31_{4-5}$ are offset from each other by a thickness of the continuous conductor wires 32 in an axial direction and are stacked in the axial direction.

Moreover, a front-end coil end group is constructed similarly.

The rest of this embodiment is constructed in a similar manner to Embodiment 2 above.

Consequently, in Embodiment 4, because the distant-address joint portions $31_{1-6}$ are also arranged so as to be offset in circumferential directions relative to the six pairs of first and second near-address joint portions $31_{2-3}$ and $31_{4-5}$, the heights of the coil end groups can be lowered and the six pairs of first and second near-address joint portions $31_{2-3}$ and $31_{4-5}$ are more easily exposed to the cooling airflows, in a similar manner to Embodiment 2 above.

According to Embodiment 4, the distant-address joint portions $31_{1-6}$ joining together the end portions of the continuous conductor wires 32 in Address 1 and Address 6 are divided into groups of three at the first and second circumferential ends of the six pairs of first and second near-address joint portions $31_{2-3}$ and $31_{4-5}$. Thus, because the amount of lead around of the end portions of the continuous conductor wires 32 constituting the distant-address joint portions $31_{1-6}$ is reduced, positioning accuracy among the end portions of the continuous conductor wires 32 is raised, improving the joining reliability of the distant-address joint portions $31_{1-6}$.

Because the lead around portions of the continuous conductor wires 32 constituting the distant-address joint portions $31_{1-6}$ are only stacked in three levels in an axial direction, the axial height of the distant-address joint portions $31_{1-6}$ can be lowered proportionately compared to Embodiment 2 above. Thus, the axial heights of the first and second near-address joint portions $31_{2-3}$ and $31_{4-5}$ can be lowered to match the distant-address joint portions $31_{1-6}$, enabling reductions in size.

Embodiment 5

Figure 16:
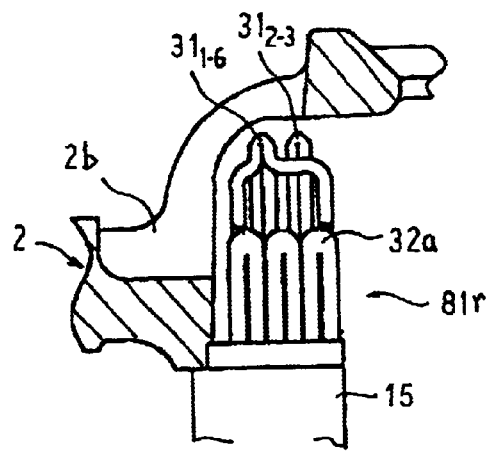
FIG. 16 is a diagram schematically showing a rear-end portion of the stator in the automotive alternator mounted with the stator according to Embodiment 5 of the present invention viewed from a circumferential direction.
Figure 17:
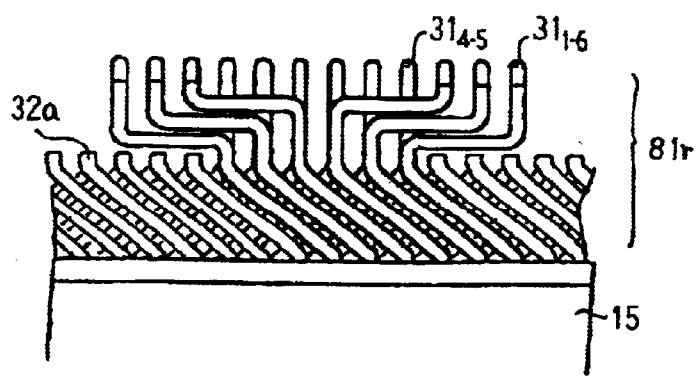
FIG. 17 is a side elevation showing the rear-end portion of the stator of the automotive alternator according to Embodiment 5 of the present invention viewed from radially outside.
Figure 18:
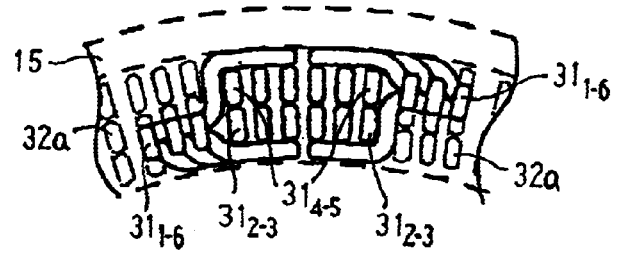
FIG. 18 is an end elevation showing the rear-end portion of the stator of the automotive alternator according to Embodiment 5 of the present invention viewed from axially outside.

FIG. 16 is a diagram schematically showing a rear-end portion of the stator in the automotive alternator mounted with the stator according to Embodiment 5 of the present invention viewed from a circumferential direction, FIG. 17 is a side elevation showing the rear-end portion of the stator of the automotive alternator according to Embodiment 5 of the present invention viewed from radially outside, and FIG. 18 is an end elevation showing the rear-end portion of the stator of the automotive alternator according to Embodiment 5 of the present invention viewed from axially outside.

In FIGS. 16 to 18, in a connection portion of the continuous conductor wires 32 in a rear-end coil end group 81r (a portion where the end portions of the continuous conductor wires 32 are joined together), six pairs of near-address joint portions each including a first near-address joint portion $31_{2-3}$ joining the end portions of the continuous conductor wires 32 extending outward from Address 2 and Address 3 of slot pairs separated by six slots and a second near-address joint portion $31_{4-5}$ joining the end portions of the continuous conductor wires 32 extending outward from Address 4 and Address 5 of the same slot pair are arranged at a pitch of one slot so as to form two rows in a circumferential direction and line up in single rows in a radial direction so as to be separated from each other at the same axial height. Six distant-address joint portions $31_{1-6}$ joining end portions of the continuous conductor wires 32 extending outward from Address 1 and Address 6 of slot pairs separated by six slots are arranged in first and second groups of three at a pitch of one slot in one row in a circumferential direction such that the first and second groups of three are disposed at first and second circumferential ends of the six pairs of first and second near-address joint portions $31_{2-3}$ and $31_{4-5}$, respectively. In addition, in FIG. 18, the first group of three distant-address joint portions $31_{1-6}$, which is on the right-hand side, is arranged in one row in a circumferential direction so as to be in the same radial position and at the same axial height as the second near-address joint portions $31_{4-5}$, and the second group of three distant-address joint portions $31_{1-6}$, which is on the left-hand side, is arranged in one row in a circumferential direction so as to be in the same radial position and at the same axial height as the first near-address joint portions $31_{2-3}$.

In other words, the end portions of the continuous conductor wires 32 extending outward from Address 1 and Address 6 of slot pairs separated by six slots extend outward from the slots 15a, then pass along an inner circumferential side and an outer circumferential side of the six pairs of first and second near-address joint portions $31_{2-3}$ and $31_{4-5}$, lead around in a circumferential direction parallel to the end surface of the stator core 15 until they are above the turn portions 32a, bend axially outward above the turn portions 32a, in addition bend in a radial direction, and are joined to each other. Portions of the first and second groups of three continuous conductor wires 32 leading around the inner circumferential side of the six pairs of first and second near-address joint portions $31_{2-3}$ and $31_{4-5}$ are offset from each other by a thickness of the continuous conductor wires 32 in an axial direction and are stacked in the axial direction. Similarly, portions of the first and second groups of three continuous conductor wires 32 leading around the outer circumferential side of the six pairs of first and second near-address joint portions $31_{2-3}$ and $31_{4-5}$ are offset from each other by a thickness of the continuous conductor wires 32 in an axial direction and are stacked in the axial direction.

Moreover, the front-end coil end group 81f is constructed similarly.

The rest of this embodiment is constructed in a similar manner to Embodiment 2 above.

Consequently, in Embodiment 5, because the distant-address joint portions $31_{1-6}$ are also arranged so as to be offset in circumferential directions relative to the six pairs of first and second near-address joint portions $31_{2-3}$ and $31_{4-5}$, the heights of the coil end groups can be lowered and the six pairs of first and second near-address joint portions $31_{2-3}$ and $31_{4-5}$ are more easily exposed to the cooling airflows in a similar manner to Embodiment 2 above.

According to Embodiment 5, the distant-address joint portions $31_{1-6}$ joining together the end portions of the continuous conductor wires 32 in Address 1 and Address 6 are divided into groups of three at the first and second circumferential ends of the six pairs of first and second near-address joint portions $31_{2-3}$ and $31_{4-5}$. Thus, because the amount of lead around of the end portions of the continuous conductor wires 32 constituting the distant-address joint portions $31_{1-6}$ is reduced, positioning accuracy among the end portions of the continuous conductor wires 32 is raised, improving the joining reliability of the distant-address joint portions $31_{1-6}$.

Because the lead around portions of the continuous conductor wires 32 constituting the distant-address joint portions $31_{1-6}$ are only stacked in three levels in an axial direction, the axial height of the distant-address joint portions $31_{1-6}$ can be lowered proportionately compared to Embodiment 2 above. Thus, the axial heights of the first and second near-address joint portions $31_{2-3}$ and $31_{4-5}$ can be lowered to match the distant-address joint portions $31_{1-6}$, enabling reductions in size.

According to Embodiment 5, the first group of three distant-address joint portions $31_{1-6}$ is arranged in one row at a first circumferential end so as to be in the same radial position and at the same axial height as the second near-address joint portions $31_{4-5}$, and the second group of three distant-address joint portions $31_{1-6}$ is arranged in one row at a second circumferential end so as to be in the same radial position and at the same axial height as the first near-address joint portions $31_{2-3}$. Thus, because the six second near-address joint portions $31_{4-5}$ and the first group of three distant-address joint portions $31_{1-6}$ can be welded in turn by setting the stator core 15 in a welding apparatus and rotating the stator core 15 at a predetermined pitch in a first circumferential direction, and then the six first near-address joint portions $31_{2-3}$ and the second group of three distant-address joint portions $31_{1-6}$ can be welded in turn by resetting the stator core 15 in the welding apparatus and rotating the stator core 15 at a predetermined pitch in the first circumferential direction, the welding operation is improved compared to Embodiment 4 above.

Moreover, in Embodiment 4 above, because the radial positions of the first and second near-address joint portions $31_{2-3}$ and $31_{4-5}$ and the distant-address joint portions $31_{1-6}$ are different, it is necessary to reset the stator core 15 in the welding apparatus to weld each type of joint portion (the first and second near-address joint portions $31_{2-3}$ and $31_{4-5}$ and the distant-address joint portions $31_{1-6}$).

Embodiment 6

Figure 19:
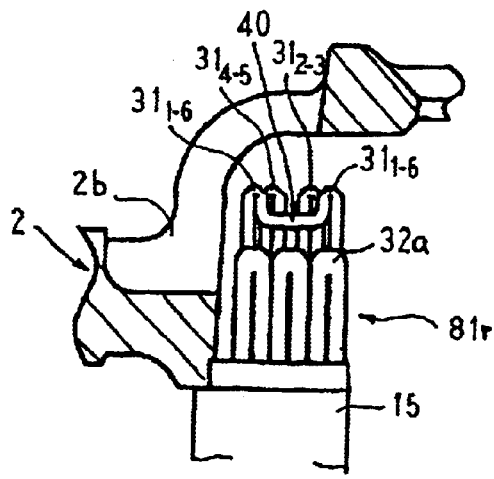
FIG. 19 is a diagram schematically showing a rear-end portion of the stator in the automotive alternator mounted with the stator according to Embodiment 6 of the present invention viewed from a circumferential direction.
Figure 20:
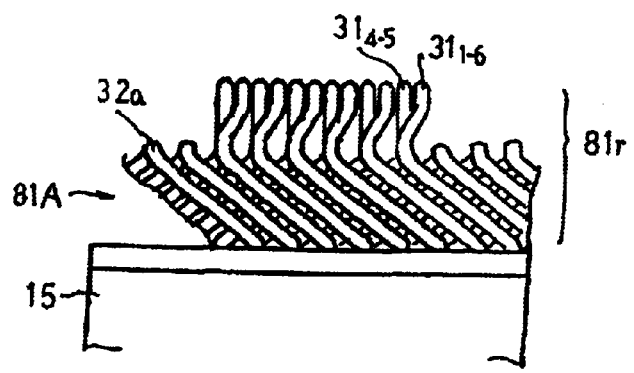
FIG. 20 is a side elevation showing the rear-end portion of the stator of the automotive alternator according to Embodiment 6 of the present invention viewed from radially outside.
Figure 21:
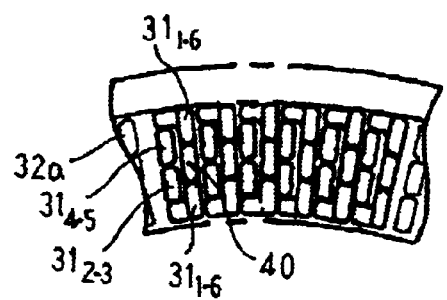
FIG. 21 is an end elevation showing the rear-end portion of the stator of the automotive alternator according to Embodiment 6 of the present invention viewed from axially outside.

FIG. 19 is a diagram schematically showing a rear-end portion of the stator in the automotive alternator mounted with the stator according to Embodiment 6 of the present invention viewed from a circumferential direction, FIG. 20 is a side elevation showing the rear-end portion of the stator of the automotive alternator according to Embodiment 6 of the present invention viewed from radially outside, and FIG. 21 is an end elevation showing the rear-end portion of the stator of the automotive alternator according to Embodiment 6 of the present invention viewed from axially outside.

In FIGS. 19 to 21, in a connection portion of the continuous conductor wires 32 in a rear-end coil end group 81r (a portion where the end portions of the continuous conductor wires 32 are joined together), six pairs of near-address joint portions each including a first near-address joint portion $31_{2-3}$ joining the end portions of the continuous conductor wires 32 extending outward from Address 2 and Address 3 of slot pairs separated by six slots and a second near-address joint portion $31_{4-5}$ joining the end portions of the continuous conductor wires 32 extending outward from Address 4 and Address 5 of the same slot pair are arranged at a pitch of one slot so as to form two rows in a circumferential direction and line up in single rows in a radial direction so as to be separated from each other at the same axial height. The end portions of the continuous conductor wires 32 extending outward from Address 1 and Address 6 of slot pairs separated by six slots are joined together by means of metal connection terminals 40 formed by bending into a U shape, and are arranged so as to be offset by a pitch of 0.5 slot in a first circumferential direction at the same height relative to the first and second near-address joint portions $31_{2-3}$ and $31_{4-5}$.

In other words, the end portions of the continuous conductor wires 32 extending outward from Address 1 and Address 6 of slot pairs separated by six slots extend outward from the slots 15a, then pass along an inner circumferential side and an outer circumferential side of each of the pairs of first and second near-address joint portions $31_{2-3}$ and $31_{4-5}$, are offset by a pitch of 0.5 slot in a first circumferential direction, and then bend so as to extend axially outward. The end portions of the continuous conductor wires 32 extending outward from Address 1 and Address 6 are each matched and welded to first and second ends of the metal connection terminals 40 inserted between adjacent pairs of the first and second near-address joint portions $31_{2-3}$ and $31_{4-5}$. Here, the joint portions joining the end portions of the continuous conductor wires 32 extending outward from Address 1 and Address 6 and the metal connection terminals 40 constitute the distant-address joint portions $31_{1-6}$.

Moreover, the front-end coil end group $81f$ is constructed similarly.

The rest of this embodiment is constructed in a similar manner to Embodiment 2 above.

In Embodiment 6, because the metal connection terminals 40 (distant-address joint portions $31_{1-6}$) are also arranged so as to be offset in circumferential directions relative to the six pairs of first and second near-address joint portions $31_{2-3}$ and $31_{4-5}$, the heights of the coil end groups can be lowered and the six pairs of first and second near-address joint portions $31_{2-3}$ and $31_{4-5}$ are more easily exposed to the cooling airflows in a similar manner to Embodiment 2 above.

Furthermore, the amount of leading around of the continuous conductor wires 32 for the distant-address joint portions is reduced, facilitating formation of the stator winding.

Because the first and second near-address joint portions $31_{2-3}$ and $31_{4-5}$ and the distant-address joint portions $31_{1-6}$ are arranged at a pitch of 0.5 slot in a circumferential direction, circumferential space occupied by the connection portions of the stator winding 81A is reduced, and when mounted to an automotive alternator, the possibility of short-circuiting between the connection portions of the stator winding 81A and the brackets 1 and 2 is reduced, improving electrical insulation proportionately.

Embodiment 7

Figure 22:
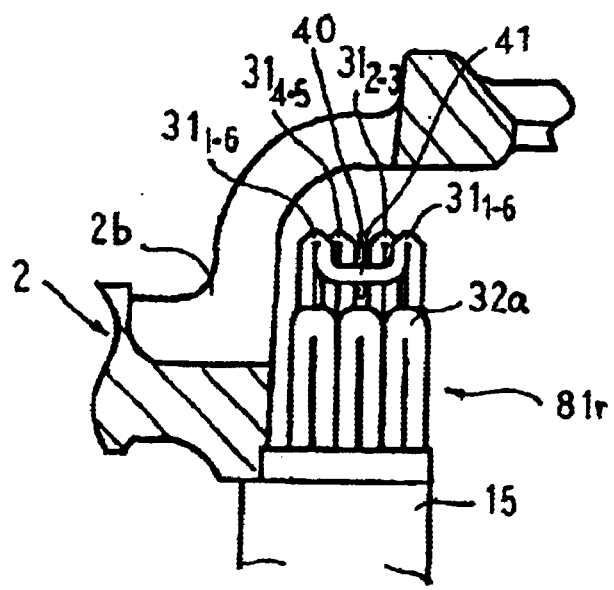
FIG. 22 is a diagram schematically showing a rear-end portion of the stator of the automotive alternator according to Embodiment 7 of the present invention viewed from a circumferential direction.

In Embodiment 7, as shown in FIG. 22, an insulating paper 41 functioning as an electrically-insulating material is interposed between first and second near-address joint portions $31_{2-3}$ and $31_{4-5}$ which line up in single rows in a radial direction, the insulating paper 41 being fixed to the first and second near-address joint portions $31_{2-3}$ and $31_{4-5}$ by varnish.

Moreover, the rest of this embodiment is constructed in a similar manner to Embodiment 6 above.

According to Embodiment 7, because the insulating paper 41 is interposed between the first and second near-address joint portions $31_{2-3}$ and $31_{4-5}$, electrical insulation between the first near-address joint portions $31_{2-3}$ and the second near-address joint portions $31_{4-5}$ is reliably ensured.

Embodiment 8

Figure 23:
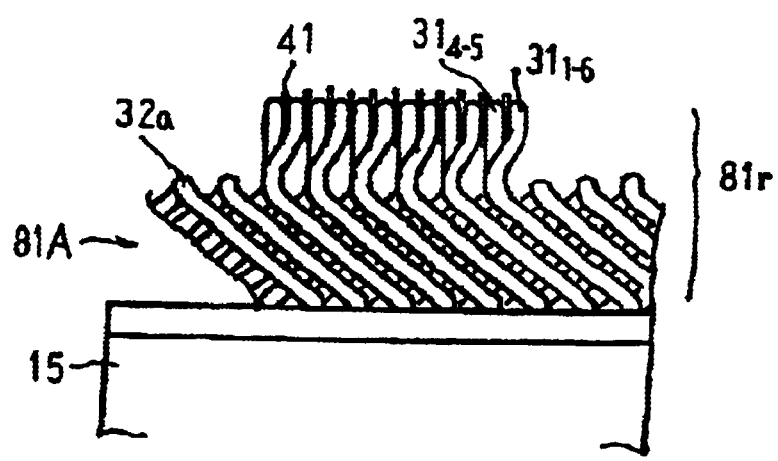
FIG. 23 is a side elevation showing the rear-end portion of the stator of the automotive alternator according to Embodiment 8 of the present invention viewed from axially outside.
Figures 24, 25:
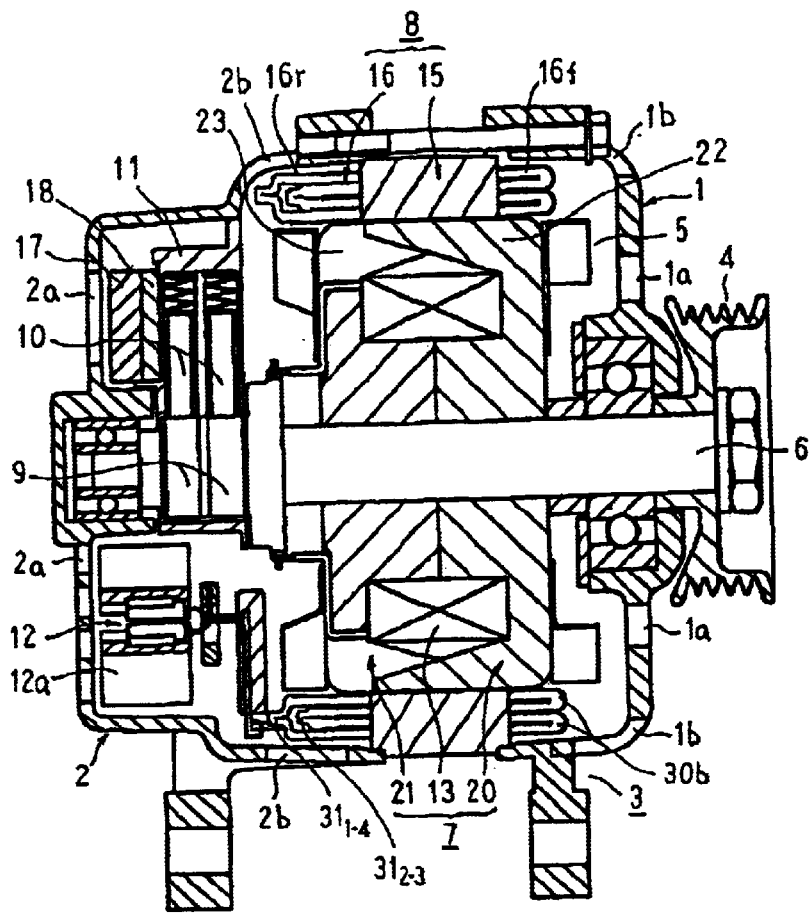
FIG. 24 is a longitudinal section showing a first conventional automotive alternator.
FIG. 25 is a perspective showing a conductor segment used in a stator winding of a stator mounted to the first conventional automotive alternator.
Figure 26:
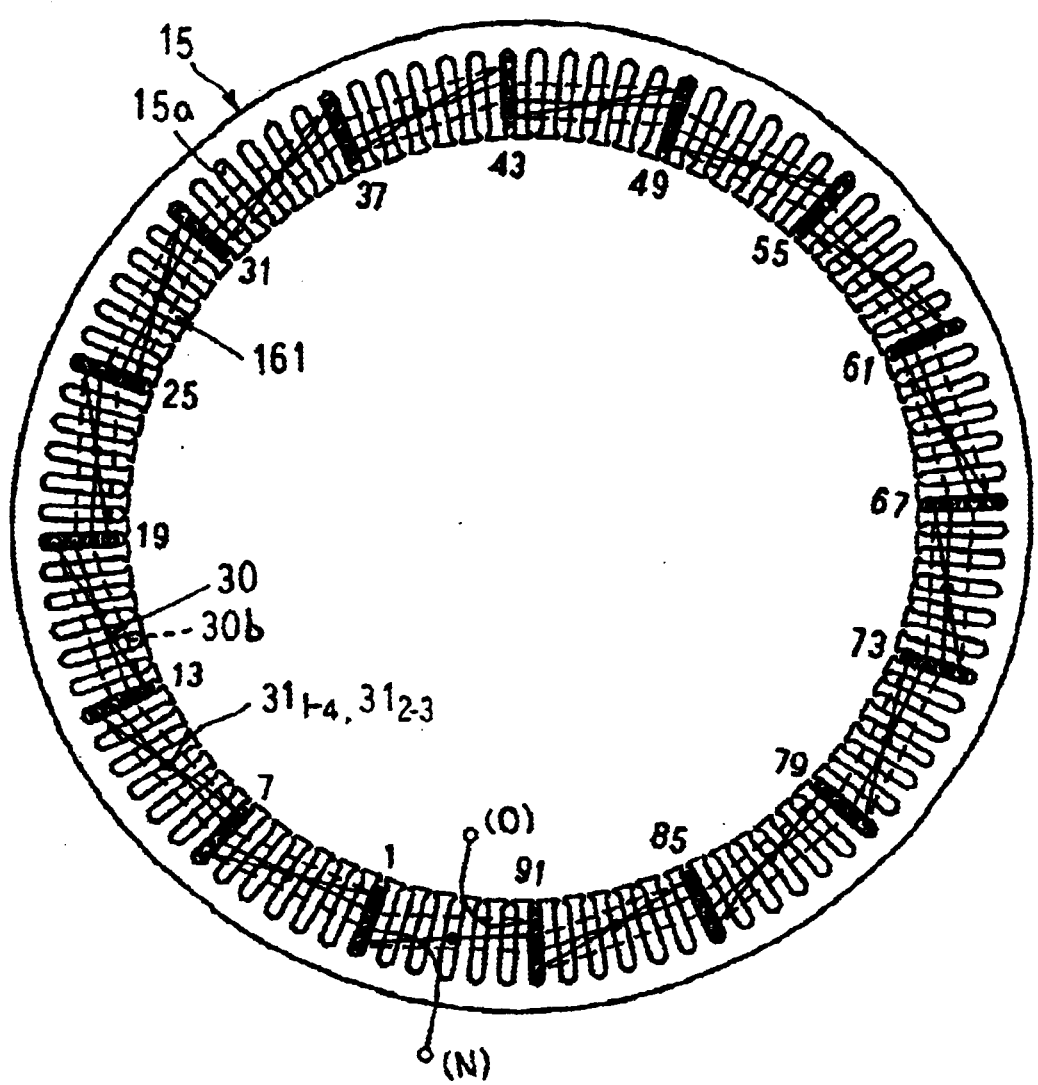
FIG. 26 is a rear end elevation schematically showing a first winding phase portion of the stator winding of the stator mounted to the first conventional automotive alternator.
Figure 27:
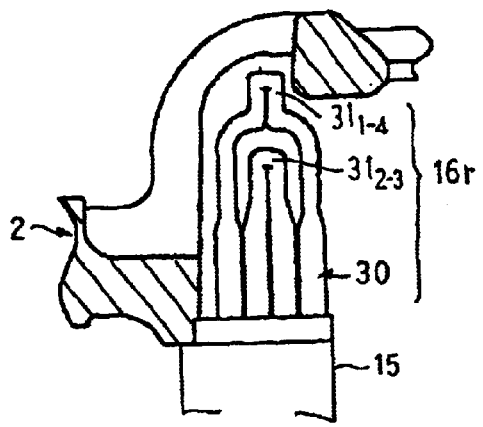
FIG. 27 is a diagram schematically showing a rear-end portion of the stator in the first conventional automotive alternator viewed from a circumferential direction.
Figure 28:
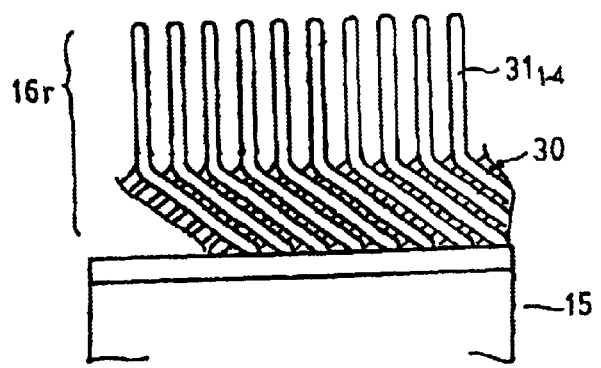
FIG. 28 is a side elevation showing the rear-end portion of the stator mounted to the first conventional automotive alternator viewed from radially outside.
Figure 29:
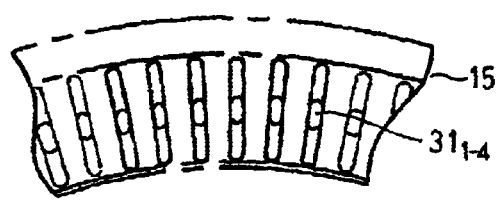
FIG. 29 is an end elevation showing the rear-end portion of the stator mounted to the first conventional automotive alternator viewed from axially outside.
Figure 30:
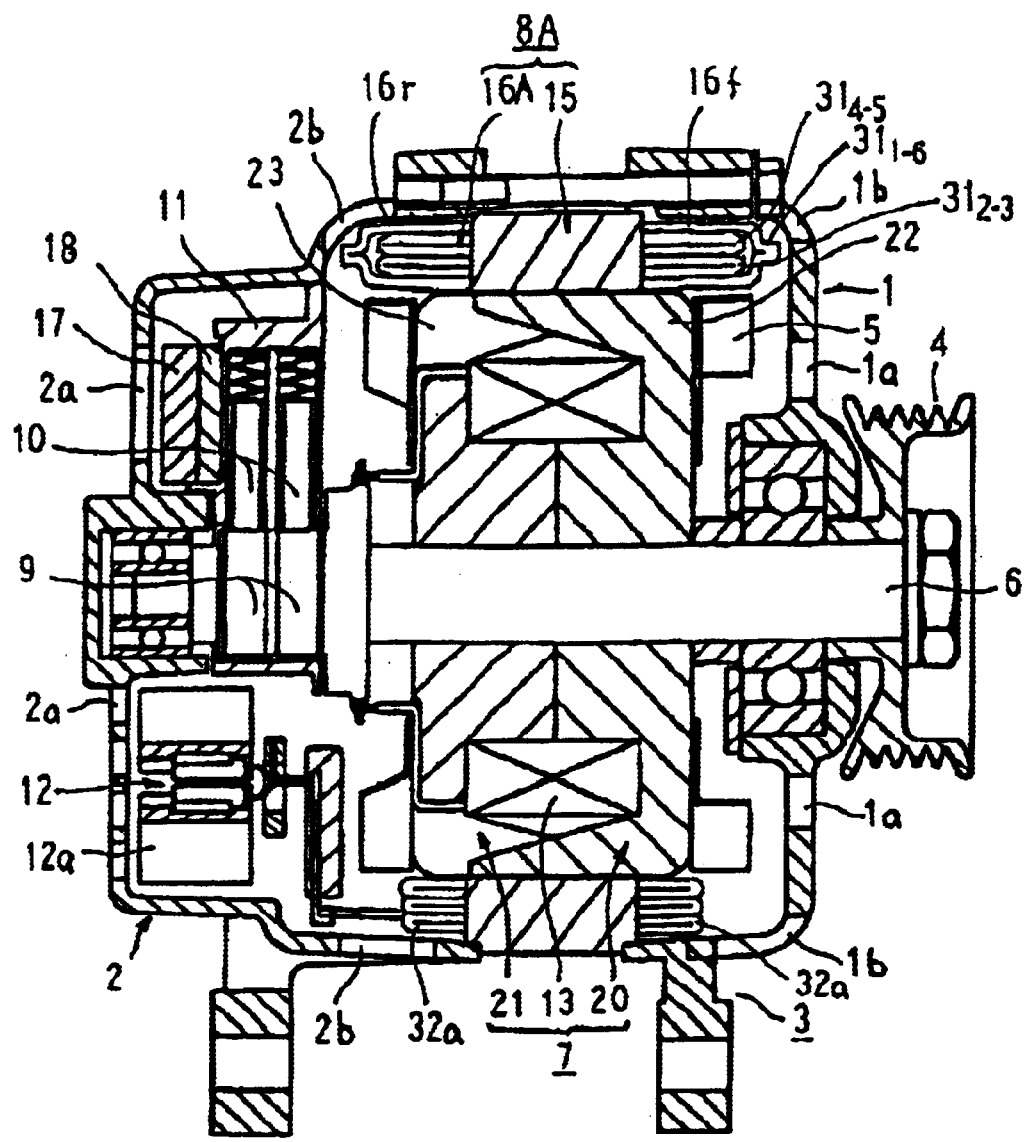
FIG. 30 is a longitudinal section showing a second conventional automotive alternator.
Figure 31:
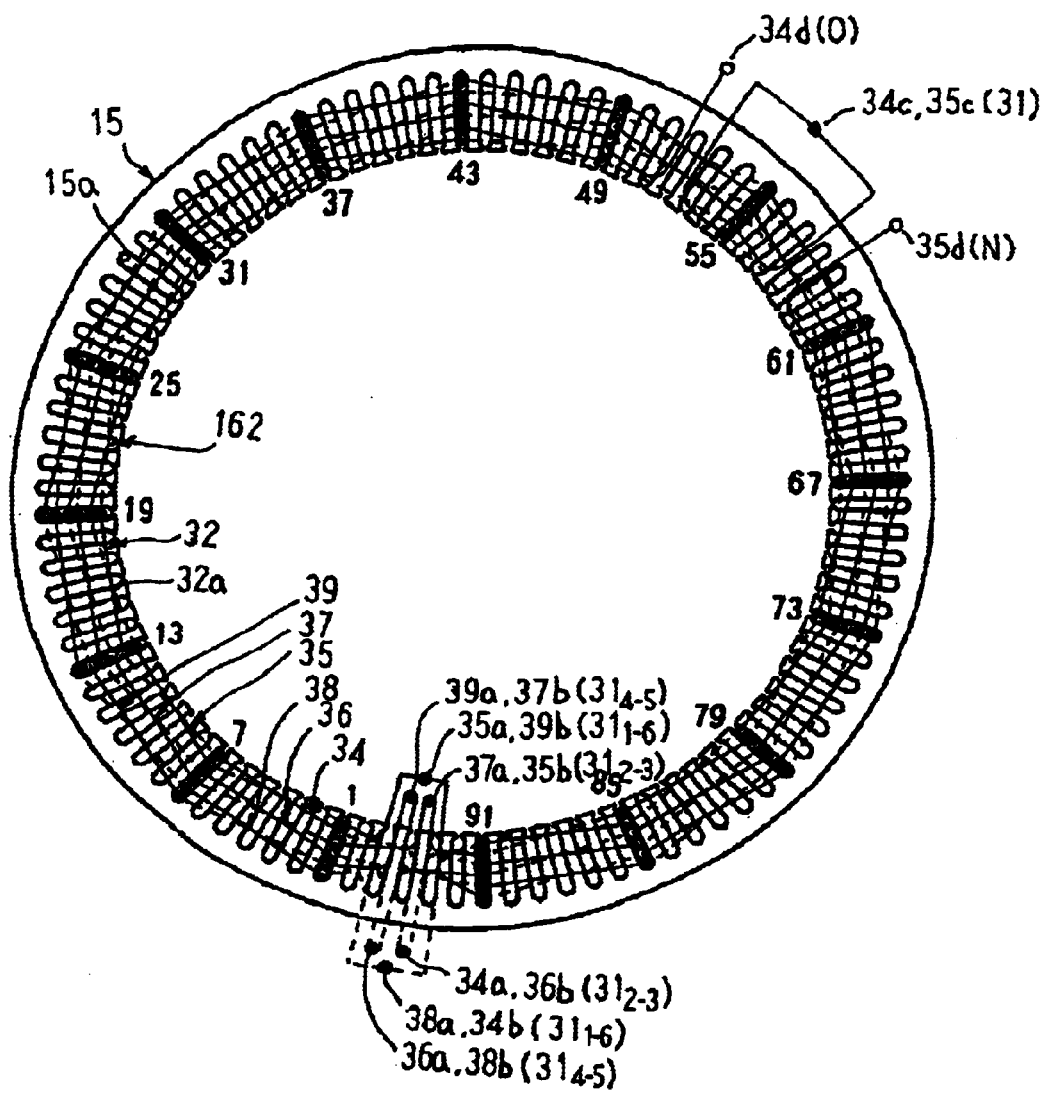
FIG. 31 is a rear end elevation schematically showing a first winding phase portion of a stator winding of a stator mounted to the second conventional automotive alternator.
Figure 32:
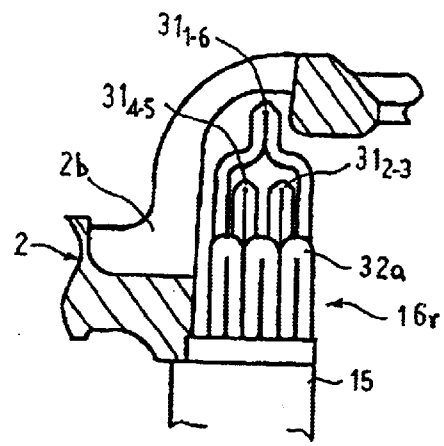
FIG. 32 is a diagram schematically showing a rear-end portion of the stator in the second conventional automotive alternator viewed from a circumferential direction.
Figure 33:
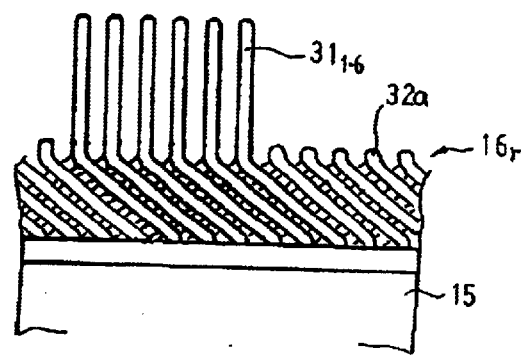
FIG. 33 is a side elevation showing the rear-end portion of the stator mounted to the second conventional automotive alternator viewed from radially outside.
Figure 34:
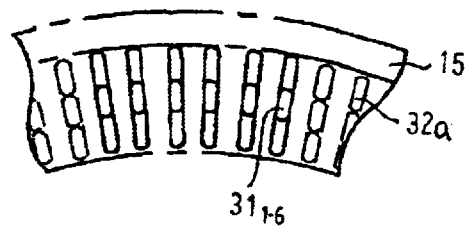
FIG. 34 is an end elevation showing the rear-end portion of the stator mounted to the second conventional automotive alternator viewed from axially outside.
Figures 35A, 35B:
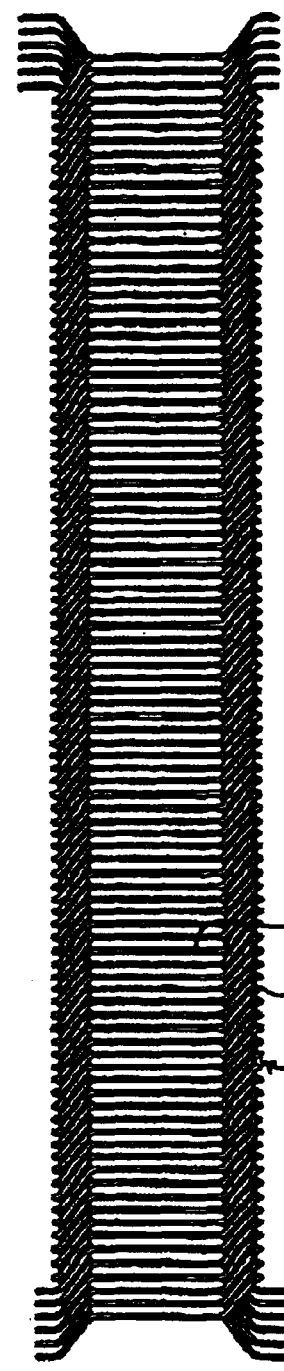
FIG. 35A is an end elevation showing a winding assembly used in the second conventional stator winding.
FIG. 35B is a side elevation showing the winding assembly used in the second conventional stator winding.
Figure 36:
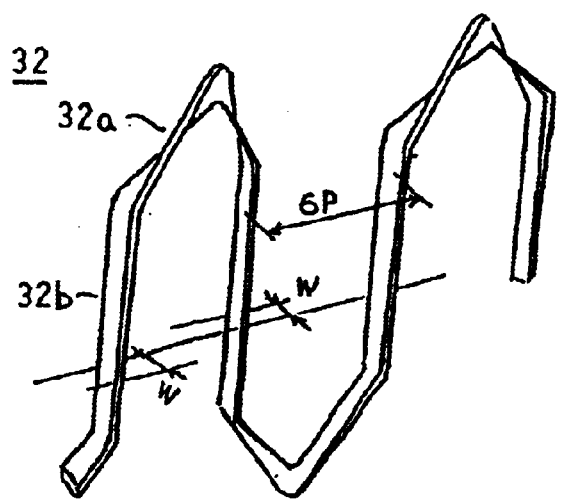
FIG. 36 is a perspective showing part of a continuous conductor wire constituting the winding assembly shown in FIGS. 35A and 35B.
Figure 37:
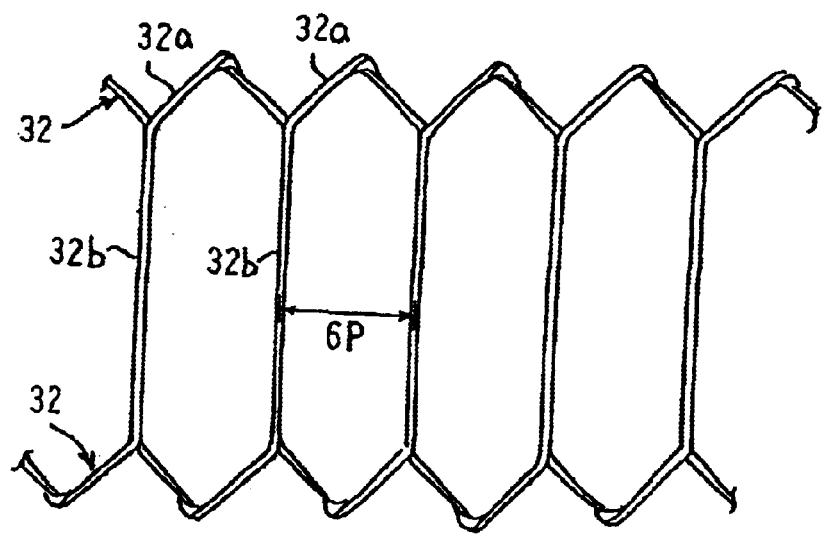
FIG. 37 is a diagram explaining arrangement of continuous conductor wires constituting the winding assembly shown in FIGS. 35A and 35B.

In Embodiment 8, as shown in FIG. 23, the insulating paper 41 is interposed between first and second near-address joint portions $31_{2-3}$ and $31_{4-5}$ which line up in single rows in a radial direction and distant-address joint portions $31_{1-6}$, the insulating paper 41 being fixed to the three types of joint portions $31_{2-3}$, $31_{4-5}$, and $31_{1-6}$ by varnish.

Moreover, the rest of this embodiment is constructed in a similar manner to Embodiment 6 above.

According to Embodiment 8, because the insulating paper 41 is interposed between the near-address joint portions $31_{2-3}$ and $31_{4-5}$ and the distant-address joint portions $31_{1-6}$, electrical insulation between the near-address joint portions $31_{2-3}$ and $31_{4-5}$ and the distant-address joint portions $31_{1-6}$ is reliably ensured.

Now, in Embodiment 8 above, continuous conductor wires 32 having a rectangular cross section are used, but conductor wires may also be used in which straight portions housed in the slots have a rectangular cross section and turn portions (coil ends) linking the straight portions have a circular cross section. In that case, even if the coil ends interfere with each other during installation of the stator winding into the stator core or when the stator is subjected to vibrations from the engine, damage to the electrically-insulating coating of the coil ends is suppressed because outer circumferential surfaces of the coil ends are smooth, improving electrical insulation. In addition, if first and second end portions of the conductor wires are given a circular cross section, damage to the electrically-insulating coating resulting from interference is also suppressed in connection portions of the conductor wires (the coil ends), further improving electrical insulation, and the first and second end portions of the conductor wires become easy to bend, improving connection workability in conductor wire connection portions with leading around of the end portions of the conductor wires. Moreover, it goes without saying that similar effects can also be achieved by adopting this kind of conductor wire construction in the other embodiments.

In Embodiments 7 and 8 above, the insulating paper 41 is interposed between the joint portions in the stator of Embodiment 6 above, but similar effects are also exhibited if the insulating paper 41 is interposed between the joint portions in the stators of the other embodiments.

Moreover, each of the above embodiments has been explained with reference to stator cores in which the slots are formed at a ratio of two per phase per pole, but similar effects can also be achieved if the present invention is applied to stator cores in which slots are formed at a ratio of one or three or more per phase per pole. When the slots are formed at a ratio of two per phase per pole, the amount of time that a tooth formed between the slots overlaps an adjacent pair of the magnetic poles relative to a radial direction is shortened compared to when the slots are formed at a ratio of one per phase per pole. As a result, magnetic flux leakage is reduced, suppressing decreases in effective magnetic flux. In addition, the generation of surges in the magnetic flux is suppressed, reducing fluctuations in generated voltage and output waveform disturbances, thereby reducing ripples when alternating current is converted into direct current.

Each of the above embodiments has been explained with reference to rotors having sixteen magnetic poles, but the number of magnetic poles in the rotor is not limited to sixteen; the number of magnetic poles may be twelve, for example.

In Embodiments 2 to 8 above, one six-turn winding phase portion 162 is constructed by stacking and installing the winding assemblies 33 in the stator core 15 in three layers, but if there is to be one four-turn winding phase portion, the winding assemblies 33 may be stacked and installed in the stator core 15 in two layers, or if there is to be one eight-turn winding phase portion, the winding assemblies 33 may be stacked and installed in the stator core 15 in four layers.

The above embodiments have been explained as they apply to stators for automotive alternators, but the present invention is not limited to stators for automotive alternators and can also be applied to stators for dynamoelectric machines such as electric motors, etc.

The present invention is constructed in the above manner and exhibits the effects described below.

According to one aspect of the present invention, there is provided a stator for a dynamoelectric machine including:

an annular stator core in which a plurality of slots extending axially are disposed in a circumferential direction; and a stator winding installed in the slots, the stator winding being provided with a plurality of winding sub-portions, each of the winding sub-portions including:

slot-housed portions housed in housing positions from Address 1 to Address m ($m \geq 4$) lined up in one row from an inner circumferential side to an outer circumferential side in each of the slots; and coil ends in which the slot-housed portions housed in different addresses in the slots in each slot pair separated by a predetermined number of slots are connected in series outside the slots, the coil ends including:

distant-address joint portions in which the slot-housed portions housed in addresses separated by three or more addresses in the slots in the each slot pair are joined together outside the slots; and near-address joint portions in which the slot-housed portions housed in addresses separated by two or less addresses in the slots in the each slot pair are joined together outside the slots, wherein the distant-address joint portions are disposed so as to be separated in a circumferential direction relative to the near-address joint portions, increasing the likelihood that the near-address joint portions are exposed to cooling airflows, and reducing axial height of the coil ends, thereby providing a compact stator for a dynamoelectric machine having superior cooling.

Each of the winding sub-portions may be constructed by inserting a plurality of conductor segments into different addresses in the slots in the each slot pair, the conductor segments each being formed into a U shape, and joining together free end portions of different conductor segments among the conductor segments extending outward from the slots from different addresses in the slots in the each slot pair, joint portions joining together the free end portions of the conductor segments being constituted by the distant-address joint portions and the near-address joint portions, whereby the joint portions are disposed in a well-balanced manner in a circumferential direction, improving ventilation balance.

The joint portions joining together the free end portions of the conductor segments may be arranged in a circumferential direction at a first end of the stator core, simplifying the joining process.

Each of the winding sub-portions may each be constructed by installing one continuous conductor wire so as to occupy different addresses in the slots at intervals of the predetermined number of slots, the coil ends being constituted by:
turn portions of the continuous conductor wires in which different slot-housed portions among the slot-housed portions in the slots in the each slot pair are linked outside the slots; and
joint portions joining together end portions of the continuous conductor wires in which different slot-housed portions among the slot-housed portions in the slots in the each slot pair are linked outside the slots,
the joint portions joining together the end portions of the continuous conductor wires being constituted by the distant-address joint portions and the near-address joint portions, greatly reducing the number of joints, thereby facilitating preparation of the stator winding.

The plurality of winding sub-portions may be constructed by installing winding assemblies in the stator core so as to be stacked in two or more layers in a slot depth direction, the winding assemblies each being formed by simultaneously folding a plurality of the continuous conductor wires, and
wherein each of the winding assemblies is constructed by arranging continuous conductor wire pairs equivalent in number to the predetermined number of slots so as to be offset by a pitch of one slot from each other, each of the continuous conductor wire pairs being composed of two of the continuous conductor wires arranged so as to be offset from each other by a pitch equivalent to the predetermined number of slots and so as to stack the slot-housed portions stacked in the slot depth direction, and the two continuous conductor wires each being formed into a pattern in which the slot-housed portions are arranged at a pitch equivalent to the predetermined number of slots and adjacent pairs of the slot-housed portions linked by the turn portions are offset so as to alternately occupy different addresses in the slots, simplifying installation of the stator winding into the stator core.

The near-address joint portions may be arranged in a circumferential direction so as to have a uniform axial height, and each of the distant-address joint portions may be disposed between circumferentially-adjacent pairs of the near-address joint portions at the same axial height as the near-address joint portions, reducing the space occupied by the joint portions, thereby suppressing the occurrence of short-circuiting incidents between the joint portions and a bracket.

The near-address joint portions may be arranged in a circumferential direction so as to have a uniform axial height, and the distant-address joint portions may be arranged in a circumferential direction at the same axial height as the near-address joint portions at a first circumferential end of a group of the near-address joint portions arranged in the circumferential direction, reducing the lead-around direction of the conductor wires for the distant-address joint portions to one circumferential direction, enabling the joint portions to be joined in turn in one circumferential direction, thereby facilitating the processes of bending and joining the conductor wires, and enabling use to be made of space above the turn portions for the distant-address joint portions, thereby facilitating joining of the distant-address joint portions.

The near-address joint portions may be arranged in a circumferential direction so as to have a uniform axial height, and the distant-address joint portions may be arranged in a circumferential direction at the same axial height as the near-address joint portions at first and second circumferential ends of a group of the near-address joint portions arranged in the circumferential direction, reducing the amount of leading around of the conductor wires, thereby raising the positioning accuracy of the distant-address joint portions and enabling the axial height of the distant-address joint portions to be lowered, and enabling use to be made of space above the turn portions for the distant-address joint portions, thereby facilitating joining of the distant-address joint portions.

The near-address joint portions may be arranged in at least one row in a circumferential direction, radial positions of the distant-address joint portions aligning with at least one row of the near-address joint portions arranged in the circumferential direction, improving the joining operation.

The distant-address joint portion may be formed by directly joining together extending portions of the slot-housed portions, eliminating the need for joining materials in a separate member, thereby reducing material costs.

The distant-address joint portion may be formed by joining together extending portions of the slot-housed portions by means of a metal connection portion, reducing the amount of leading around of the conductor wires for the distant-address joint portions, thereby facilitating formation of the stator winding.

An electrically-insulating material may be interposed in at least one position selected from a group including a position between the distant-address joint portion and the near-address joint portion, a position between two of the distant-address joint portions, and a position between two of the near-address joint portions, providing superior electrical insulation.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A stator for a dynamoelectric machine comprising:
an annular stator core in which a plurality of slots extending axially are disposed in a circumferential direction; and
a stator winding installed in said slots, said winding comprising a plurality of winding sub-portions, each of said winding sub-portions comprising:
slot-housed portions housed in a plurality of housing positions of said slots so as to be lined up in one row from an inner circumferential side to an outer circumferential side in each of said slots, wherein each of said housing portions is designated by a corresponding address indicating a location of each of said housing portions from said inner circumferential side to said outer circumferential side in each of said slots, and the total number of said housing positions in each of said slots is greater than or equal to four; and coil ends in which said slot-housed portions housed in different addresses in said slots in each slot pair separated by a predetermined number of slots are connected in series outside said slots, said coil ends including:

distant-address joint portions in which said slot-housed portions housed in addresses separated by at least three addresses in said slots in said slot pair are joined together outside said slots; and near-address joint portions in which said slot-housed portions housed in addresses separated by less than three addresses in said slots in said each slot pair are joined together outside said slots, wherein said distant-address joint portions are disposed so as to be separated in a circumferential direction relative to said near-address joint portions.

2. The stator for a dynamoelectric machine according to claim 1 wherein each of said winding sub-portions comprises a plurality of conductor segments inserted into different addresses in said slots in said each slot pair, said conductor segments having a U shape, and joining together free end portions of different conductor segments among said conductor segments extending outward from said slots from different addresses in said slots in said each slot pair, joint portions joining together said free end portions of said conductor segments being constituted by said distant-address joint portions and said near-address joint portions.

3. The stator for a dynamoelectric machine according to claim 2 wherein said joint portions joining together said free end portions of said conductor segments are arranged in a circumferential direction at a first end of said stator core.

4. The stator for a dynamoelectric machine according to claim 1 wherein each of said winding sub-portions comprises a single continuous conductor wire installed so as to occupy different addresses in said slots at intervals of said predetermined number of slots, said coil ends comprising:

turn portions of said continuous conductor wires in which different slot-housed portions among said slot-housed portions in said slots in said each slot pair are linked outside said slots; and joint portions joining together end portions of said continuous conductor wires in which different slot-housed portions among said slot-housed portions in said slots in said each slot pair are linked outside said slots, said joint portions joining together said end portions of said continuous conductor wires being constituted by said distant-address joint portions and said near-address joint portions.

5. The stator for a dynamoelectric machine according to claim 4 wherein said plurality of winding sub-portions are constructed by installing winding assemblies in said stator core so as to be stacked in at least two layers in a slot depth direction, said winding assemblies each being formed by simultaneously folding a plurality of said continuous conductor wires, and wherein each of said winding assemblies is constructed by arranging continuous conductor wire pairs equivalent in number to said predetermined number of slots so as to be offset by a pitch of one slot from each other, each of said continuous conductor wire pairs being composed of two of said continuous conductor wires arranged so as to be offset from each other by a pitch equivalent to said predetermined number of slots and so as to stack said slot-housed portions in said slot depth direction, and said two continuous conductor wires each being formed into a pattern in which said slot-housed portions are arranged at a pitch equivalent to said predetermined number of slots and adjacent pairs of said slot-housed portions linked by said turn portion are offset so as to alternately occupy different addresses in said slots.

6. The stator for a dynamoelectric machine according to claim 1 wherein said near-address joint portions are arranged in a circumferential direction so as to have a uniform axial height, and each of said distant-address joint portions is disposed between circumferentially-adjacent pairs of said near-address joint portions at the same axial height as said near-address joint portions.

7. The stator for a dynamoelectric machine according to claim 6 wherein said near-address joint portions are arranged in at least one row in a circumferential direction, radial positions of said distant-address joint portions aligning with at least one row of said near-address joint portions arranged in said circumferential direction.

8. The stator for a dynamoelectric machine according to claim 4 wherein said near-address joint portions are arranged in a circumferential direction so as to have a uniform axial height, and said distant-address joint portions are arranged in a circumferential direction at the same axial height as said near-address joint portions at a first circumferential end of a group of said near-address joint portions arranged in said circumferential direction.

9. The stator for a dynamoelectric machine according to claim 8 wherein said near-address joint portions are arranged in at least one row in a circumferential direction, radial positions of said distant-address joint portions aligning with at least one row of said near-address joint portions arranged in said circumferential direction.

10. The stator for a dynamoelectric machine according to claim 4 wherein said near-address joint portions are arranged in a circumferential direction so as to have uniform axial height, and said distant-address joint portions are arranged in a circumferential direction at the same axial height as said near-address joint portions at first and second circumferential ends of a group of said near-address joint portions arranged in said circumferential direction.

11. The stator for a dynamoelectric machine according to claim 10 wherein said near-address joint portions are arranged in at least one row in a circumferential direction, radial positions of said distant-address joint portions aligning with at least one row of said near-address joint portions arranged in said circumferential direction.

12. The stator for a dynamoelectric machine according to claim 1 wherein each of said distant-address joint portions comprises extending portions of said slot-housed portions which are directly joined together.

13. The stator for a dynamoelectric machine according to claim 1 wherein each of said distant-address joint portions comprises extending portions of said slot-housed portions joined together by means of metal connection portion.

14. The stator for a dynamoelectric machine according to claim 1 wherein an electrically-insulating material is interposed in at least one position selected from a group comprising a position between said distant-address joint portion and said near-address joint portion, a position between two of said distant-address joint portions, and a position between two of said near-address joint portions.

* * * * *